Figure 1:
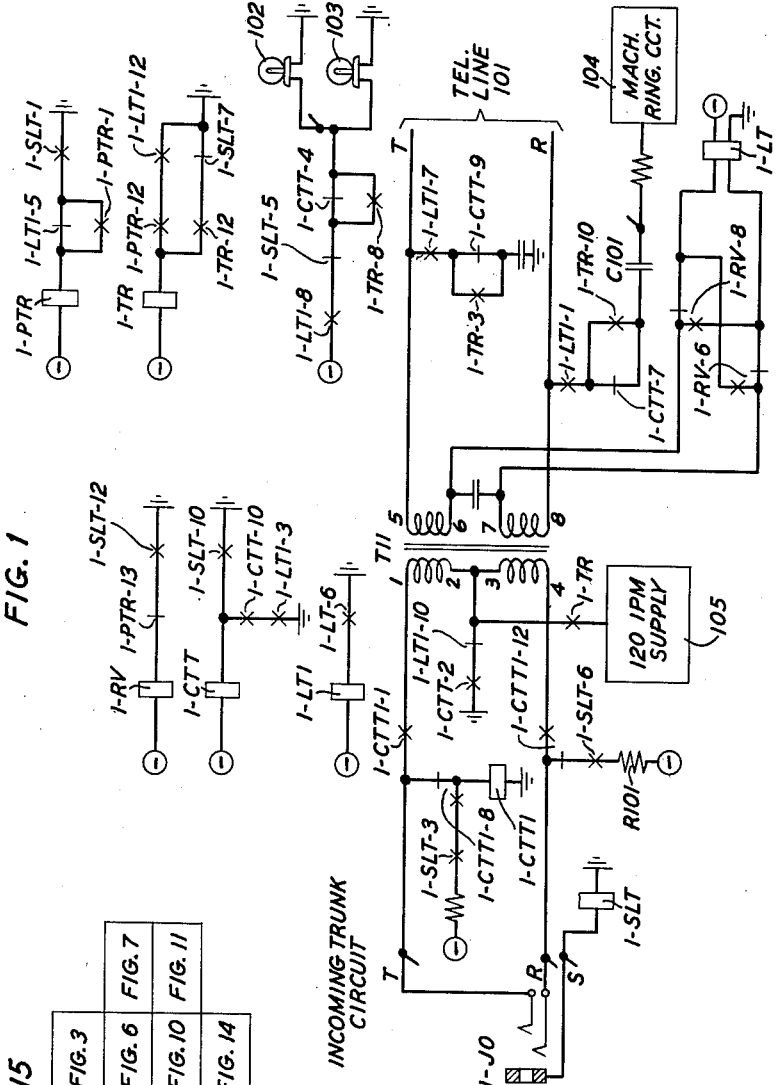
Figure 2:
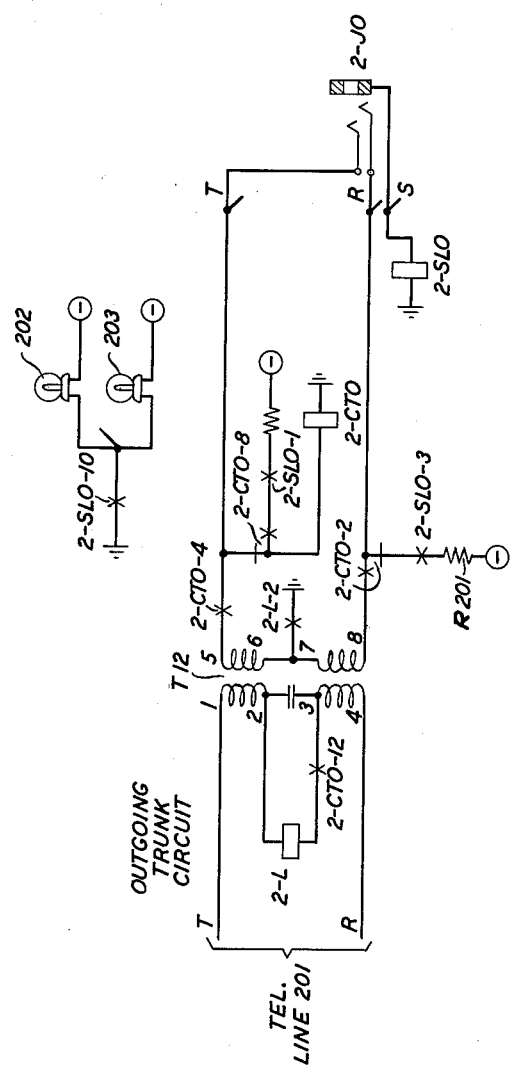

May 12, 1964     A. E. BACHELET ETAL     3,133,152
TELETYPEWRITER SWITCHBOARD
Filed March 8, 1962     15 Sheets—Sheet 15
FIG. 16
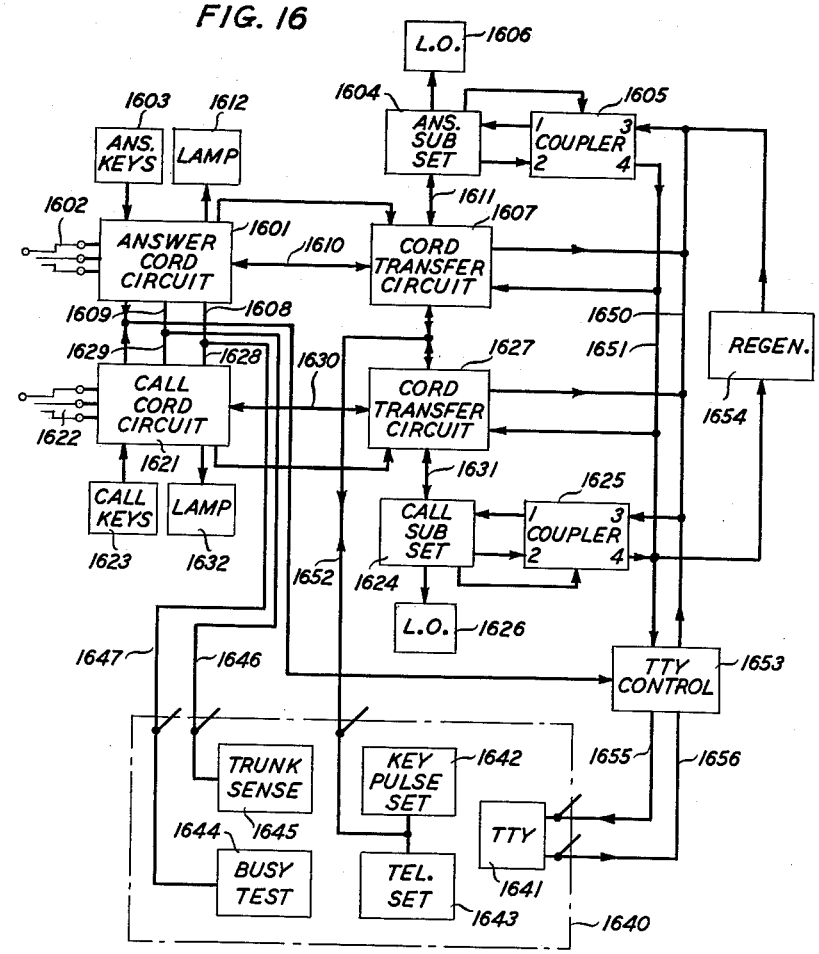
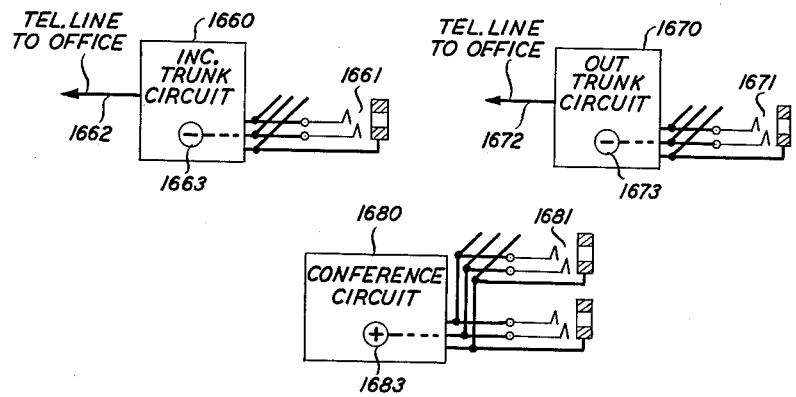

United States Patent Office 3,133,152
Patented May 12, 1964

3,133,152
TELETYPEWRITER SWITCHBOARD
Albert E. Bachelet, New York, Fred B. Crowson, Brooklyn, Wayne V. K. Large, Locust Valley, Gerald A. Martingano and Richard A. Previte, Brooklyn, Theodore C. Rehm, Islip, and Todd A. Smith, Brooklyn, N.Y., assignors to Bell Telephone Laboratories, Incorporated, New York, N.Y., a corporation of New York
Filed Mar. 8, 1962, Ser. No. 178,335
8 Claims. (Cl. 178—75)

This invention relates to a teletypewriter swichboard and more particularly, to a switchboard for completing calls over the telephone switching network for teletypewriter or data set subscribers.

A broad object of this invention is to provide an improved switchboard for teletypewriter or data set subscriber calls.

A teletypewriter switchboard is utilized to handle assistance requests and set up conference calls by manually completing connections through the switchboard cord circuits. A teletypewriter subscriber requiring assistance seizes an incoming trunk having an appearance at the switchboard. The switchboard operator answers the call by inserting one end of a cord circuit into the incoming trunk whereby the operator may communicate with the switchboard teletypewriter to determine the nature of the subscriber's request. If the subscriber requires assistance to complete a call, the operator has the option of inserting the other end of the cord into an outgoing trunk to complete the call through the cord circuit or disconnecting the original call prior to originating the call to the second subscriber. In the latter event, when the called subscriber is connected, the operator originates another call to the original subscriber by inserting the previously disconnected end of the cord circuit into another outgoing trunk. This call is thus completed through the cord circuit and the two outgoing trunks. In a conference call each subscriber is attached to one end of an individual cord circuit and the other end is inserted in a common conference circuit whereby the subscribers are interconnected.

In the copending application of T. L. Doktor, G. Parker, L. A. Weber and H. M. Zydney, Serial No. 141,672, filed September 29, 1961, which issued as Patent 3,113,176 on December 3, 1963, there is disclosed a subscriber data set connected to the telephone switching network and functioning to communicate therethrough with remote data set subscribers. A call is originated by a subscriber in substantially the same manner as a telephone subscriber places a call whereby the subscriber dials the digits of the desired remote subscriber and the call is processed through the telephone switching network in the conventional manner. In addition, upon the initiation of the call, the calling subscriber's subset is placed in the calling or originating mode whereby the subset transmits frequency-shift signals in a first voice frequency band, hereinafter designated the $F_1$ frequency band, and detects signals in a second voice frequency band, hereinafter designated the $F_2$ frequency band. At the called station, when the call is answered the subset is placed in the answering or terminating mode to transmit signals in the $F_2$ frequency band and receive signals in the $F_1$ frequency band. In addition, the called subset initiates a connect sequence by first providing a one second guard interval of no signal transmission followed by the transmission of a marking signal in the $F_2$ frequency band. At the originating station a marking signal in the $F_1$ frequency band is returned after one second of continuous reception of the marking signal in the $F_2$ frequency band and the subset placed in a condition to communicate with the remote subscriber. Similarly, the remote subscriber set is conditioned for communication one second after the continuous reception of the marking signal in the $F_1$ frequency band.

The present invention contemplates a switchboard arranged to communicate with data set subscribers.

It is another object of this invention to establish the transmission mode of a cord circuit data set.

More particularly, it is an object of this invention to determine the transmission mode of a cord circuit data set in accordance with the type of trunk connected thereto.

In accordance with the present invention, the trunks having appearances at the switchboard extend to the telephone central office and each end of the several cord circuits is provided with a data subset whereby connections may be set up to remote subscribers through the telephone switching network. In addition, each operator is provided with a digit key pulsing set for originating calls and a telephone set for communicating with remote telephone subscribers.

It is a feature of this invention that the trunk connected to the cord circuit is sensed to determine whether a call is being answered over an incoming trunk or originated over an outgoing trunk whereupon the cord circuit subset is placed in the appropriate transmission mode.

It is another feature of this invention that the operator's teletypewriter is connected to the cord circuit subset when the connect sequence has been concluded.

The means for fulfilling the foregoing objects and the practical embodiment of the feature of this invention will be fully understood from the following description taken in conjunction with the accompanying drawing wherein:

FIGS. 1–14, when arranged as shown in FIG. 15, show the details of circuits and equipment which cooperate to form a switchboard in accordance with this invention; and FIG. 16 illustrates in block form the various equipment and circuits of the system and the manner in which they cooperate.

In the several figures of the drawings, the relay contacts are shown detached from the relay windings. The relay winding is given an appropriate designation such as 8–TA where "8" indicates the figure member of the drawing in which the winding is located and "TA" identifies the individual winding. The contacts associated with the relay winding are given the same designation together with a contact member. Contacts which are closed when the relay is de-energized, known as "break" contacts, are represented by a single short line perpendicular to the conductor line, while contacts which are closed when the relay is energized, known as "make" contacts, are represented by two short, crossed lines diagonally intersecting the conductor line.

*General Description*

Referring now to FIG. 16, the switchboard in accordance with the presenet invention is shown in block form together with an incoming trunk circuit, generally indicated by block 1660, an outgoing trunk circuit, generally indicated by block 1670, and a conference circuit, generally indicated by block 1680. It is to be understood that a plurality of trunk and conference circuits may be provided in accordance with the calls that will be handled by the switchboard. Incoming trunk circuit 1660 includes jack 1661 and a source of negative potential 1663 connectable to the ring lead of jack 1661 through a high impedance path. In addition, incoming trunk circuit 1660 is connected to the telephone central office by way of telephone line 1662. Outgoing trunk circuit 1670 includes jack 1671 and a source of negative potential 1673 connectable to the ring lead of jack 1671 through a low impedance path. Telephone line 1672 connects outgoing trunk circuit 1670 to the telephone central office. Conference circuit 1680 is provided with a plurality of jacks such as jack 1681 and a source of positive potential 1683 connectable to the ring leads of the conference circuit jacks.

The switchboard is provided with a plurality of cord circuits of which the cord circuit, as shown in FIG. 16, including answering cord circuit 1601 and calling cord circuit 1621 may be considered typical. Associated with the cord circuit shown in FIG. 16 is an operator's position circuit, generally indicated by block 1640, which position circuit is also preferably associated with other cord circuits, not shown.

Plug 1602 extends from answering cord circuit 1601 which is also connected to answering key panel 1603 and lamp panel 1612. In addition, answering cord circuit 1601 is associated with cord transfer circuit 1607 and answering subset 1604, which subset is arranged in substantially the same manner as the above-identified application of T. L. Doktor et al. Connected to answering subset 1604 is the listen-only handset 1606 and coupler 1605.

Similarly, plug 1622 extends from calling cord circuit 1621 and calling key panel 1623 and lamp panel 1632 are provided for calling cord circuit 1621. In addition, cord transfer circuit 1627 and calling subset 1624 are associated with calling cord circuit 1621 and listen-only handset 1626 and coupler 1625 are connected to calling subset 1624.

Regenerator 1654 and teletypewriter control circuit 1653 are common to both of the cord circuits.

Operator's position circuit 1640 is provided with teletypewriter 1641, key pulsing set 1642 and telephone set 1643. In addition, operator's position circuit 1640 includes trunk sensing circuit 1645 and busy test circuit 1644.

Assuming now that an incoming call is received over incoming trunk circuit 1660, the incoming trunk lamp, not shown, is energized and the operator answers the call by depressing the type key in key panel 1603 and inserting plug 1602 in jack 1661. With the answer-type key depressed, answering cord circuit 1601 extends the sleeve lead of plug 1602 to busy test circuit 1644 by way of leads 1608 and 1647. In addition, teletypewriter control circuit 1653 is controlled by answering cord circuit 1601 to extend D.-C. signaling lead 1651 to teletypewriter 1641 by way of lead 1655 and extend transmitting lead 1656 of teletypewriter 1641 to lead 1650.

The insertion of plug 1602 in jack 1661 connects busy test circuit 1644 to the sleeve lead of jack 1661 whereby a determination is made whether another cord circuit is connected to incoming trunk circuit 1660. In the event the previous connection to trunk circuit 1660 has been effected, a busy test lamp, not shown, is energized by busy test circuit 1644 and the operator removes the answering cord plug and releases the answering key to restore the cord circuit to the initial quiescent state.

Assuming now that no other cord circuit is connected to incoming trunk circuit 1660, busy test circuit 1644 is satisfied that the trunk circuit is idle and therefore instructs answering cord circuit 1601 to extend the ring lead of plug 1602 to trunk sensing circuit 1645 through leads 1609 and 1646. In addition, answering cord circuit 1601 opens busy test lead 1608. Trunk sensing circuit 1645 now is enabled to determine the type of trunk attached to answering cord circuit 1601 by examining the potential source extended to the ring lead of jack 1661. Since a negative potential is applied through a high impedance to the ring lead of jack 1661, trunk sensing circuit 1645 determines that the attached trunk is an incoming trunk circuit and therefore instructs answering cord circuit 1601 to place answering subset 1604 in the terminating mode whereby a connection may be effected with an originating subscriber. In response to the instruction from trunk sensing circuit 1645, answering cord circuit 1601 also sends an off-hook signal to incoming trunk circuit 1660 to complete the connection from the originating subscriber. In addition, answering cord circuit 1601 arranges cord transfer circuit 1607 to extend the circuit from plug 1602 through signaling leads 1610 and 1611 to answering subset 1604. Answering cord circuit 1601 then opens trunk sensing lead 1609.

With answering subset 1604 placed in the terminating mode and connected through to the originating subscriber, the connect sequence is initiated. As disclosed in the above-identified application of T. L. Doktor et al., this sequence comprises the transmission of a marking signal in the $F_2$ frequency band by the terminating subset after an initial guard interval. When the originating subset receives the connect signal, it returns a marking signal in the $F_1$ frequency band and answering subset 1604, in response thereto, arranges coupler 1605 to connect the D.-C. output of answering subset 1604 to lead 1651 through terminals 2 and 4 and extend D.-C. signaling lead 1650 through terminals 3 and 1 to the input of answering subset 1604. Under this condition, signals from the originating subscriber subset in the $F_1$ frequency band are applied to answering subset 1604 through signaling leads 1610 and 1611 and the resultant D.-C. output signals of answering subset 1604 are applied to teletypewriter 1641 by way of leads 1651 and 1655. The D.-C. signals transmitted by the operator's teletypewriter are applied through leads 1656 and 1650 and coupler 1605 to answering subset 1604. These signals are converted to frequency shift signals in the $F_2$ frequency band and then transmitted through signaling leads 1611 and 1610 to incoming trunk circuit 1660 and then through the telephone network to the originating subscriber. In this manner the switchboard operator determines the service request of the teletypewriter subscriber.

To disconnect the connection, the operator releases the answering key and removes plug 1602 from jack 1661. This restores the cord circuit to the initial quiescent state and provides an on-hook signal to incoming trunk circuit 1660. The reception of the on-hook signal by the originating subscriber is interpreted as an end-of-message signal, as disclosed in the above-identified application of T. L. Doktor et al. If the originating subscriber initiates the disconnect, lamp 1612 is energized and the switchboard operator completes the disconnect by removing plug 1602 and releasing the answering key.

The operator may originate a teletypewriter call by connecting either the answering cord or the calling cord to an outgoing trunk circuit. Assuming the operator desires to use the answering cord circuit, the type key in key panel 1603 is depressed and plug 1602 is inserted in jack 1671 of outgoing trunk circuit 1670, for example. With the answering key depressed, teletypewriter 1641 is attached to leads 1650 and 1651 and the sleeve lead of plug 1602 is extended to the busy test circuit 1644 in the same manner as previously described. With plug 1602 inserted in jack 1671, busy test circuit 1644, when satisfied that the trunk circuit is idle, instructs answering cord circuit 1601 to extend the ring lead of plug 1602 to trunk sensing circuit 1645 and open busy test lead 1608. Since the ring lead of jack 1671 of outgoing trunk circuit 1670 extends to negative potential source 1673 through a low impedance path, trunk sensing circuit 1645 determines that the attached trunk is an outgoing trunk circuit. Accordingly, trunk sensing circuit 1645 advises answering cord circuit 1601 to place answering subset 1604 in the originating mode. Answering cord circuit 1601 also opens sensing lead 1609 and returns an off-hook signal to outgoing trunk circuit 1670, which off-hook signal is reconveyed to the telephone central office to prepare the central office for the reception of digit pulses. As is well known in the art, the telephone central office, when ready, returns a sender-ready signal to the outgoing trunk circuit. In addition, answering cord circuit 1601 instructs cord transfer circuit 1607 to extend signaling lead 1610 to talk path 1652 which, in turn, extends to key pulsing set 1642 and telephone set 1643. The subsequent reception of the sender-ready signal energizes lamp 1612 indicating to the operator that the key pulsing of the digits may proceed. Thus the operator, at this time, key pulses the digits which are transmitted through talk path 1652 and then through signaling lead 1610 to outgoing trunk circuit 1670, simultaneously monitoring the progress of the call by utilizing telephone set 1643.

After the digits are key pulsed, the telephone central office proceeds to effect a connection to the desired remote subscriber in the same manner as a telephone call is completed. As disclosed in the above-identified application of T. L. Doktor et al., the data set subscriber responds to the call by returning an off-hook signal and initiating the connect sequence. This off-hook signal is detected by answering cord circuit 1601 which instructs cord transfer circuit 1607 to transfer signaling lead 1610 to answering subset 1604 by way of signaling lead 1611. With answering subset 1604 in the originating mode at this time, the subset responds to the connect sequence signal from the remote subscriber by returning a marking signal in the $F_1$ frequency band and then instructs coupler 1605 to connect the D.-C. side of the subset to leads 1650 and 1651 whereby teletypewriter signaling may be communicated from teletypewriter 1641 in the operator's position circuit to the remote subscriber. It is noted, at this time, that the operator may monitor the connect sequence by utilizing listen-only handset 1606 to determine whether a telephone subscriber has been reached in error. The manner of advising the telephone subscriber that an error has been made is described hereinafter.

At the termination of the message interval the operator may disconnect by removing plug 1602 from jack 1671 and releasing the type key in the answer panel 1603. This restores the cord circuit to the initial quiescent state and sends an off-hook signal to outgoing trunk 1670, as previously described. If the teletypewriter subscriber disconnects first, the off-hook signal received by answering cord circuit 1601 energizes lamp 1612 and the operator then disconnects by removing plug 1602 and releasing the type key in the answer panel 1603, as previously described.

In the event that the operator utilizes calling cord circuit 1621 to originate a teletypewriter call, the type key in calling key panel 1623 is depressed and calling cord circuit 1621 extends the sleeve lead of plug 1622 to busy test circuit 1644 through leads 1628 and 1647. In addition, calling cord circuit 1621 instructs teletypewriter control circuit 1653 to attach teletypewriter 1641 to leads 1650 and 1651. Busy test circuit 1644 now determines whether outgoing trunk circuit 1670 is busy and if the trunk is idle, calling cord circuit 1621 opens busy test leads 1628 and extends the ring lead of plug 1622 to trunk sensing circuit 1645 by way of lead 1629. When trunk sensing circuit 1645 detects negative potential source 1673 through the low impedance path, calling cord circuit 1621 places calling subset 1624 in the originating mode, provides an off-hook signal to outgoing trunk circuit 1670, opens sensing lead 1629 and instructs cord transfer circuit 1627 to extend signaling lead 1630 to talking path 1652. Accordingly, the subsequent reception of the sender-ready signal from the telephone central office energizes lamp 1632 whereby the operator is advised to key pulse the digits.

When the remote teletypewriter subset returns an off-hook signal, calling cord circuit 1621 instructs cord transfer circuit 1627 to transfer signal lead 1630 to calling subset 1624 by way of lead 1631. Calling subset 1624 responds to the subsequent completion of the connect sequence by arranging coupler 1625 to connect the D.-C. side of the subset to leads 1650 and 1651. Thus calling cord circuit 1621 effects the connection between teletypewriter 1641 and the remote teletypewriter subscriber in substantially the same manner as answering cord circuit 1601. Similarly, the call is disconnected by removing plug 1622 and releasing the type key in calling key panel 1623.

In a typical service request a teletypewriter subscriber calls the switchboard operator and requests a connection to another subscriber. In this event, the calling subscriber is connected to the operator's position through the answering cord circuit, as previously described. The operator then proceeds to insert plug 1622 of the calling cord circuit into the jack of an outgoing trunk circuit and originate a call to the subscriber desired in the same manner as previously described. When the called subscriber answers and the connect sequence is completed, both the subscribers are connected together and may communicate with each other. Since the calling subscriber's subset is in the originating mode and the answering subset 1604 is in the terminating mode, signals from the calling subscriber in the $F_1$ frequency band are converted to D.-C. signals by answering subset 1604, which signals are applied to lead 1651, as previously described. The D.-C. signals are regenerated by regenerator 1654 and reapplied through coupler 1625 to calling subset 1624. Since calling subset 1624 is in the originating mode, as previously described, the signals are thus transmitted in the $F_2$ frequency band to the called subscriber by way of calling cord circuit 1621 and the outgoing trunk circuit. Conversely, signals received from the called subscriber are converted to D.-C. signals by calling subset 1624 and these signals are applied to lead 1651, as previously described, and then through regenerator 1654 and coupler 1605 to answering subset 1604. Thus the signals are retransmitted to the calling subset in the $F_2$ frequency band through answering cord circuit 1601 and the incoming trunk circuit.

During the interchange of signals by the subscriber, the operator may disconnect position circuit 1640 by releasing the type keys in panels 1603 and 1623. This resets teletypewriter control circuit 1653 whereby teletypewriter 1641 is disconnected from leads 1650 and 1651. The operator may thereafter reconnect by reoperating the appropriate type keys.

Either subscriber may disconnect and the disconnect signal energizes an associated lamp in the lamp panel. The operator then completes the disconnect sequence in the same manner as previously described.

The operator may complete a connection between two subscribers by calling each of the subscribers and connecting them through the switchboard. In this situation, answering cord circuit 1601 is connected to one outgoing trunk circuit and the first subscriber is called. Calling cord circuit 1621 is then connected to another outgoing trunk circuit to call the other subscriber. Since the operator has originated both calls, both answering subset 1604 and calling subset 1624 are in the originating mode. This does not effect the interconnection of the teletypewriter subscribers, however, since the signals are interchanged through the D.-C. path which includes regenerator 1654.

If a subscriber requests a conference call set up, with one cord circuit connected to the subscriber the other cord circuit is connected to conference circuit 1680. Assuming that plug 1622 of calling cord circuit 1621 is inserted in jack 1681, positive potential source 1683 indicates to trunk sensing circuit 1645, after the busy test sequence has been satisfied, that the conference circuit is connected to calling cord circuit 1621. Calling cord circuit 1621 accordingly instructs cord transfer circuit 1627 to extend signaling path 1630 to leads 1650 and 1651. Under this arrangement, signals from the teletypewriter subscriber which are applied to lead 1650 are passed through cord transfer circuit 1627 and calling cord circuit 1621 to conference circuit 1680. To complete the conference connection other cord circuits are similarly interconnected between teletypewriter subscribers and the conference circuit. Accordingly, the D.-C. signals applied to the conference circuit are conveyed through the other cord circuits to the other teletypewriter subscribers in the conference set up.

The switchboard is arranged to originate telephone calls through either answering cord circuit 1601 or calling cord circuit 1621. Assuming that a telephone call is originated by the operator through answering cord circuit 1601, a talk key in answer key panel 1603 is depressed and plug 1602 is inserted in jack 1671, for example. The depression of the talk key initially extends lead 1608 to busy test lead 1647 and when the busy test is satisfied, lead 1609 is extended to trunk sensing lead 1646 in the same manner as previously described. When trunk sensing circuit 1645 determines that an outgoing trunk circuit is connected, answer cord circuit 1601 sends an off-hook signal and instructs cord transfer circuit 1607 to extend signaling lead 1610 to talk path 1652. Accordingly, when the sender-ready signal is returned by the telephone office, the operator key pulses the digits to call the desired telephone set in the same manner as a teletypewriter subscriber is called. When the remote telephone station goes off-hook, however, talk path 1652 is maintained connected to signaling lead 1610 whereby the operator may communicate with the remote telephone set by utilizing telephone set 1643. The switchboard is then disconnected at the termination of the conversation by removing plug 1602 and releasing the talk key in answer key panel 1603.

It is recalled that when the operator originates a teletypewriter call a telephone subscriber may be reached in error. When this occurs, the operator depresses the talk key in the appropriate key panel. This re-establishes the connection of talk path 1652 to the cord circuit and the operator may advise the telephone subscriber that the call has been made in error. To terminate the call the operator must disconnect in the same manner as previously described, before originating a new call to the desired teletypewriter subscriber.

*Answering a Call From the Telephone Network*

A teletypewriter subscriber requiring assistance is able to dial into an incoming trunk circuit. This lights the incoming trunk lamps at the several operator positions in the switchboard. The first switchboard operator to connect an answering call into the appropriate incoming trunk jack will be able to service the request. Subsequent operator connections will not interfere with the initial connection and a position-busy lamp will light in the position of the subsequent operator to indicate that the request has been handled.

When the telephone office recognizes that a call is being made to an incoming trunk circuit, such as the incoming trunk circuit shown in FIG. 1, telephone line 101 which extends to the telephone office is closed completing a path from ground through a winding of relay 1-LT, the break contacts of contact 1-RV-6, terminal 7 to terminal 8 of repeater coil T11, the ring lead and tip lead of line 101, terminal 5 to terminal 6 of repeater coil T11, the break contacts of contact 1-RV-8, and the other winding of relay 1-LT to negative battery. This results in the operation of relay 1-LT which completes an obvious operating path for relay 1-LT1. The operation of relay 1-LT1 extends negative battery to the incoming trunk lamps such as lamps 102 and 103 through make contacts 1-LT1-8, break contacts 1-SLT-5 and break contacts 1-CTT-4. In addition, relay 1-LT1 operated extends the machine ringing circuit, generally indicated by block 104, to the ring lead of telephone line 101 through capacitor C101, break contacts 1-CTT-7 and make contacts 1-LT1-1, providing an audible ring tone to the calling subscriber.

The switchboard operator answers a call by operating the answer-type key to condition the answering cord and inserts the answering cord into the incoming trunk circuit jack. The operation of the answer-type key extends ground through normally-open contacts 801 to the winding of relay 8-TY. Relay 8-TY operated then completes an obvious operating path for relay 8-TA. In addition, relay 8-TY operated extends the input to transistor Q2B which transistor drives keyer circuit, generally indicated by block 1201, through varistor CR1202, lead 1206, the make contacts of contacts 8-TY-9, FIG. 5, leads 502 and 504, break contacts 4-CCT-3, FIG. 7, and break contacts 4-ACT-3 to the output of the regenerator circuit, generally indicated by block 701. Since the output of regenerator 701 is connected through resistor R701 to negative battery, the input to transistor Q2B is maintained in the negative marking condition. Relay 8-TY operated also extends the output of transistor Q1B, which transistor is driven by teletypewriter 1202, through lead 1207, make contacts 8-TY-10, FIG. 5, leads 503 and 505, and break contacts 4-CCT-4 and 4-ACT-4 to the input of regenerator 701.

Teletypewriter 1202 is provided with select magnet 1205, "break" contacts 1203 and send contacts 1204 and, in normal idle condition, marking ground is applied through contacts 1203 and 1204 to the junction of resistors R1202 and R1203. Under this condition, with ground applied to the base of transistor Q1B through resistor R1204, transistor Q1B is maintained OFF and the input to regenerator 701 is maintained in the negative marking condition though resistor R702. Keyer 1201 applies marking current through select magnet 1205 when ground is provided to the input thereof, which ground is normally passed through break contacts 12-HD-2. Upon the operation of relay 12-HD, as described hereinafter, this marking ground is applied to the input of keyer 1201 through the emitter-to-collector circuit of transistor Q2B when the transistor is turned ON. Since, as previously described, negative battery is applied through diode CR1202, which negative battery is then applied to the base of transistor Q2B, the transistor is maintained in the conductive condition whereby marking current is maintained through select magnet 1205 upon the subsequent operation of relay 12-HD.

Returning now to relay 8-TA operated, an operating path is completed for relay 12-HD through lead 807 and make contacts 8-TA-12, removing the previously-described marking ground applied to the input of keyer 1201. In addition, relay 8-TA operated extends ground to the winding of relay 5-AC through make contacts 8-TA-6, contacts 501 of the answer-type key and break contacts 4-CT-7 and 5-CC-10, operating relay 5-AC. The operation of relay 12-HD completes the operating path for relay 12-SR through make contacts 12-HD-3 and break contacts 12-TS-6 and 12-CS-6. The circuit now awaits the connection of the answering cord to the incoming trunk circuit.

After operating the answer-type key the switchboard operator connects the answer cord to the incoming trunk circuit by inserting answer plug 4-ACD into trunk jack 1-JO. This extends the ground on the sleeve lead of the incoming trunk circuit applied through the winding of relay 1-SLT to the sleeve lead of the answering cord which ground is extended through break contacts 4-SL-11, make contacts 5-AC-7, and lead 401 to the position circuit shown in FIGS. 12 and 13. The two windings of marginal relays 12-MG1 in the position circuit are connected in parallel and multipled to each of leads 401 in the several cord circuits. Accordingly, ground is extended through one of the windings of marginal relay 12-MG1 and the winding of relay 12-B to negative battery, operating both of these relays. The operation of relay 12-MG1 opens a possible operating path for relay 12-LO through the break contacts of contacts 12-MG1-2 and applies battery through the make contacts of contacts 12-MG1-2 and the second winding of relay 12-MG1 to lead 401. This additional battery applied to lead 401 supplies sufficient current through the incoming trunk circuit sleeve relay 1-SLT to operate the relay. Relay 1-SLT operated opens the previously-described energizing path for the incoming trunk lamps such as lamps 102 and 103. Relay 1–SLT operated also connects negative battery to the ring lead of the incoming trunk circuit through the high impedance of resistor R–101, make contacts 1–SLT–6 and the break contacts of contacts 1–CTT1–12. The operation of relay 1–SLT completes an operating path for the relay 1–RV through make contact 1–SLT–12 and break contact 1–PTR–13, and relay 1–RV, in turn, reverses the battery and ground applied to telephone line 101 by transferring the negative battery through the make contacts of contacts 1–RV–6 and terminals 7 and 8 of repeater coil T11 to the ring lead, and transferring ground through the make contacts of contacts 1–RV–8 and terminals 6 and 5 of repeater coil T11 to the tip lead, signaling to the central office that the connection to the cord circuit has been effected. In addition, relay 1–SLT operated completes an obvious operating path for relay 1–CTT through make contact 1–SLT–10 and relay 1–CTT locks through make contacts 1–SLT–3. Relay 1–CTT, in turn, opens the previously-described path extending machine ringing circuit 104 to the ring lead of telephone line 101 tripping the audible ring signal sent back to the calling subscriber.

Returning now to relay 12–B operated, an operating path is completed for relay 12–BB through make contacts 12–B–3 and break contacts 12–LO–9. Relay 12–BB, in turn, extends ground through make contacts 12–BB–10 which ground is applied in multiple to leads 402 of the several cord circuits associated with the operator's position circuit. The ground on lead 402 is further extended through make contacts 5–AC–6, FIG. 4, and a winding of relay 4–SL operating the relay, which locks through make contacts 4–SL–12 to the ground on the sleeve lead of the answering cord.

With relay 4–SL operated, the previously-described operating paths for relays 12–MG1 and 12–B are open, releasing the latter two relays, and relay 12–B released releases relay 12–BB in turn. In addition, relay 4–SL operated extends the negative battery applied to the ring lead of the incoming trunk circuit through the ring lead of the answering cord, the break contacts of contacts 4–CT–2, make contacts 4–SL–10, break contacts 4–ACR–4, make contacts 5–AC–12, lead 403, diode CR1201, the winding of marginal relay 12–MG and the winding of relay 12–TS to ground, operating relay 12–TS. The negative battery applied to the ring lead does not operate marginal relay 12–MG, however, since, as previously described, this battery is provided through the high impedance of resistor R101. Accordingly, relay 12–TS operates and relay 12–MG does not operate, to indicate that the cord circuit is attached to an incoming trunk circuit. The function of relay 12–TS operated, together with relay 12MG released, provides a sensing indicator which determines the mode of the data subset as described hereinafter.

Figure 4:
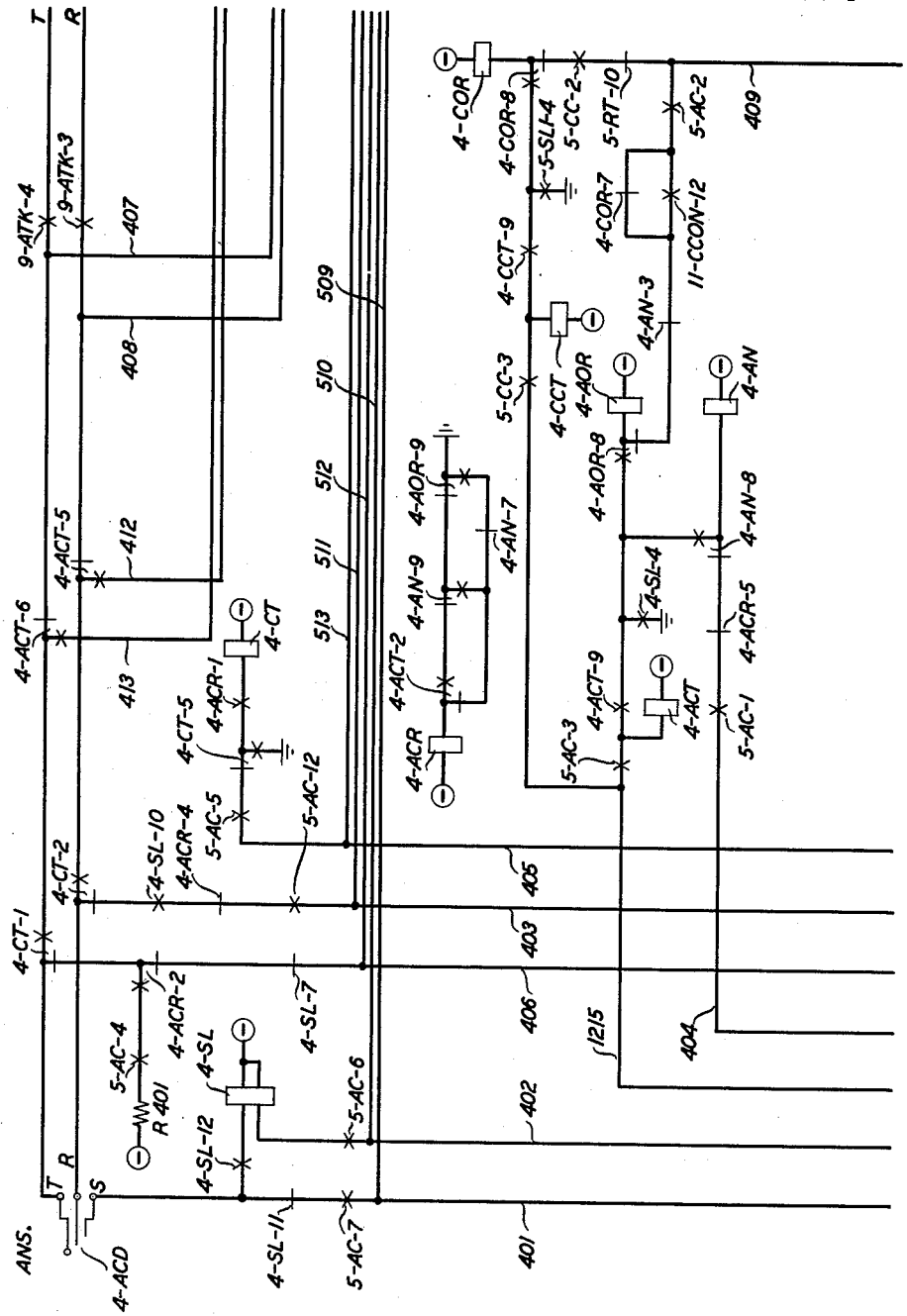
Figure 5:
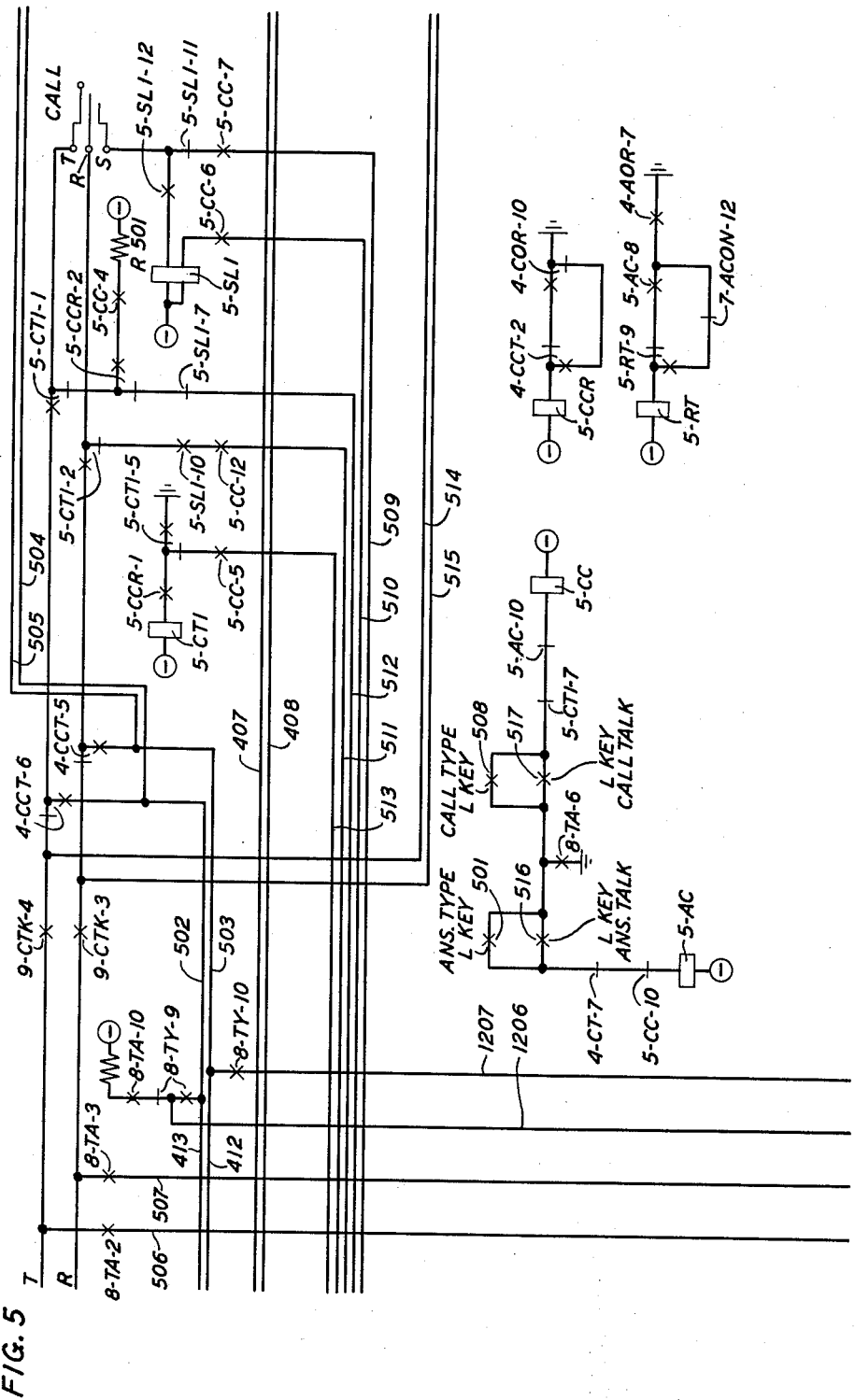
Figure 12:
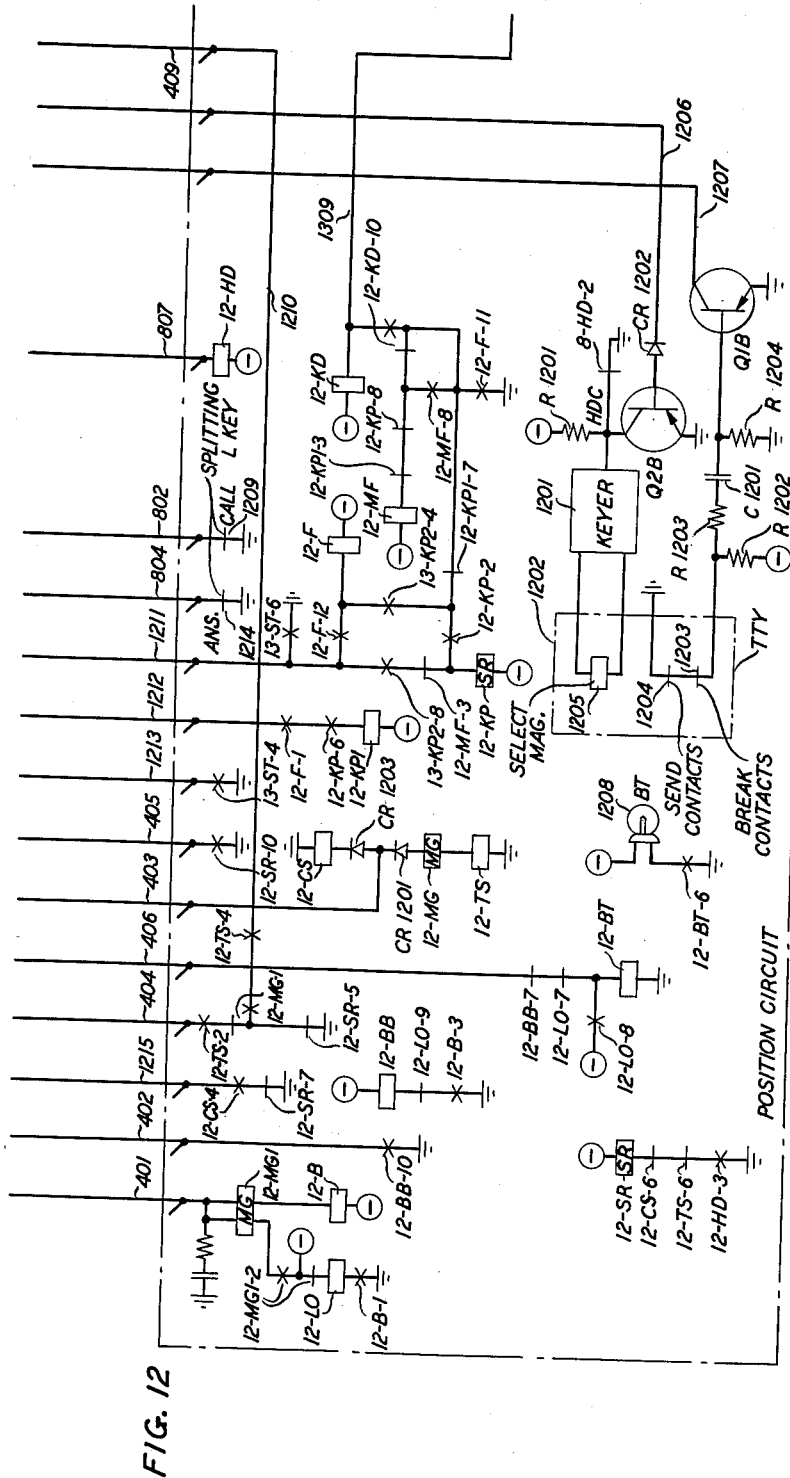

The operation of relay 12–TS now opens the previously-described operating path for slow-to-release relay 12–SR, and upon the release of relay 12–SR a path is completed from ground through break contacts 12–SR–5, FIG. 12, the break contacts of contacts 12–MG–1, make contacts 12–TS–2, lead 404, make contacts 5–AC–1, FIG. 4, break contacts 4–ACR–5, the break contacts of contacts 4–AN–8 to the winding of relay 4–AN which operates and locks to ground through make contacts 4–SL–4. The operation of relay 4–AN initiates the operation of the answering subset shown in FIG. 6 and a portion of FIGS. 7 and 10, and places the subset in the terminating mode, as described hereinafter. In addition, relay 4–AN operated completes the operating path for relay 4–ACR through the break contacts of contacts 4–ACT–2, the make contacts of contacts 4–AN–9 and break contacts 4–AOR–9. Relay 4–ACR operated opens the previously-described path extending sensing lead 403 to the ring lead of the answering cord whereby relay 12–TS releases. In addition, relay 4–ACR operated extends negative battery through resistor R401, make contacts 5–AC–4, make contacts 4–ACR–2, the break contacts of contacts 4–CT–1, the tip leads of the answering cord and the incoming trunk circuit and the break contacts of contacts 1–CTT1–8 to the winding of relay 1–CTT1 which relay operates and locks to negative battery through make contacts 1–SLT–3. Relay 1–CTT1 operated extends the tip and ring leads of the incoming trunk circuit across terminals 1 and 4 of repeater coil T11 by way of make contacts 1–CTT–1 and the make contacts of contacts 1–CTT1–12 and removes the negative battery applied to the ring lead through the break contacts of contacts 1–CTT1–12.

The release of relay 12–TS recompletes the previously-described operating path for relay 12–SR and relay 12–SR extends ground through make contacts 12–SR–10, FIG. 12, lead 405, make contacts 5–AC–5, FIG. 4, the break contact of contacts 4–CT–5 and make contacts 4–ACR–1 to the winding of relay 4–CT which locks through the make contacts of contacts 4–CT–5. The operation of relay 4–CT opens the previously-described operating path for relay 5–AC, releasing the latter relay. In addition, relay 4–CT operated cuts through the tip and ring leads of the cord to the answering subset. This path is traced from the tip lead of the answering cord through the make contacts of contacts 4–CT–1, the break contacts of contacts 4–ACT–6, lead 407, to input terminal 1 of hybrid 601 and from the ring lead of the answering cord through the make contacts of contacts 4–CT–2, the break contacts of contacts 4–ACT–5 and lead 408 to input terminal 2 of hybrid 601. Accordingly, with relays 4–AN and 4–CT operated the answering subset is activated to operate at the terminating mode and is cut through to the incoming trunk circuit by way of the answering cord.

Busy Test Circuit

Assuming now that a second operator responds to the energization of an incoming trunk lamp, such as lamp 103, by operating the answer-type key in the cord circuit associated with the position circuit of the second operator, this operates relay 8–TY followed by the operation of relay 8–TA, as previously described. The operation of relay 8–TA operates relay 12–HD which in turn operates relay 12–SR in the position circuit of the second operator. In addition, relay 8–TA operates relay 5–AC whereby the sleeve lead of the answering cord is connected through lead 401 of the cord circuit to the windings of marginal relay 12–MG1 in the position circuit. Assuming now that relay 12–MG1 in the position circuit of the first operator has previously operated, the additional negative battery applied through the second winding of relay 12–MG1 to the sleeve lead of the incoming trunk circuit reduces the current flowing through the sleeve lead in the position circuit of the second operator, which current will be enough to operate relay 12–B but insufficient to operate marginal relay 12–MG1. As a result, an operating path is completed for relay 12–LO through the break contacts of contacts 12–MG1–2, the winding of relay 12–LO and make contact 12–B–1. Relay 12–LO operated, in turn, completes an operating path for relay 12–BT through make contacts 12–LO–8. This completes an energizing path for busy test lamp 1208 through make contacts 12–BT–6.

Assuming now that the second operator connects the answering cord to the incoming trunk circuit after the operation of relay 4–SL in the cord circuit of the first operator, in this event the negative battery extended to the sleeve lead of the answering cord of the first operator through the winding of relay 4–SL precludes the operation of relay 12–MG1 in the position circuit of the second operator.

The energization of lamp 1201 indicates to the operator that the incoming trunk has been previously answered by another operator. Accordingly, the second operator removes the answering cord and restores the answer-type key. The restoration of the answer-type key releases relay 8–TY which, in turn, releases relay 8–TA. The release of relay 8–TA releases relay 12–HD and relay 5–AC. Relay 12–HD, in turn, opens the operating path for relay 12–SR. The removal of the answering cord opens the sleeve lead to release relay 12–B. When relay 12–B releases, relay 12–LO releases, in turn. This releases relay 12–BT which, in turn, de-energizes lamp 1208. Thus the position and cord circuits of the second operator are restored to the initial quiescent condition.

The operator may also determine whether the incoming trunk circuit is busy by touching the tip of the answering cord to the sleeve of the trunk circuit. Since relay 12–BT is connected to the tip lead of the answering cord via break contacts 12–LO–7 and 12–BB–7, lead 406, break contacts 4–SL–7, FIG. 4, the break contacts of contacts 4–ACR–2 and the break contacts of contacts 4–CT–1, application of negative battery to the trunk sleeve by another position circuit operates relay 12–BT. The operation of relay 12–BT thus energizes lamp 1208 indicating a busy trunk.

*Subset Operation*

Figure 6:
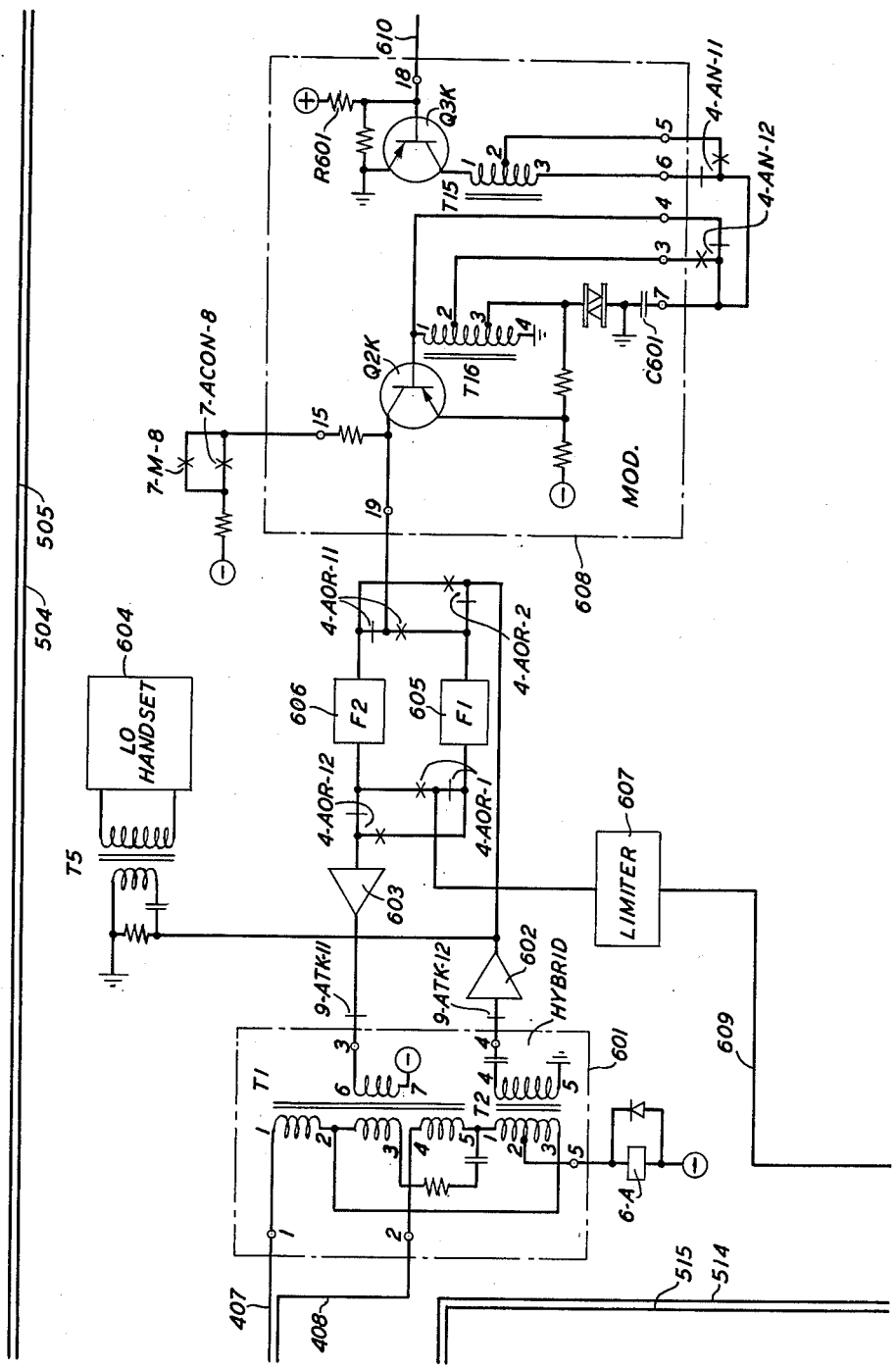
Figure 14:
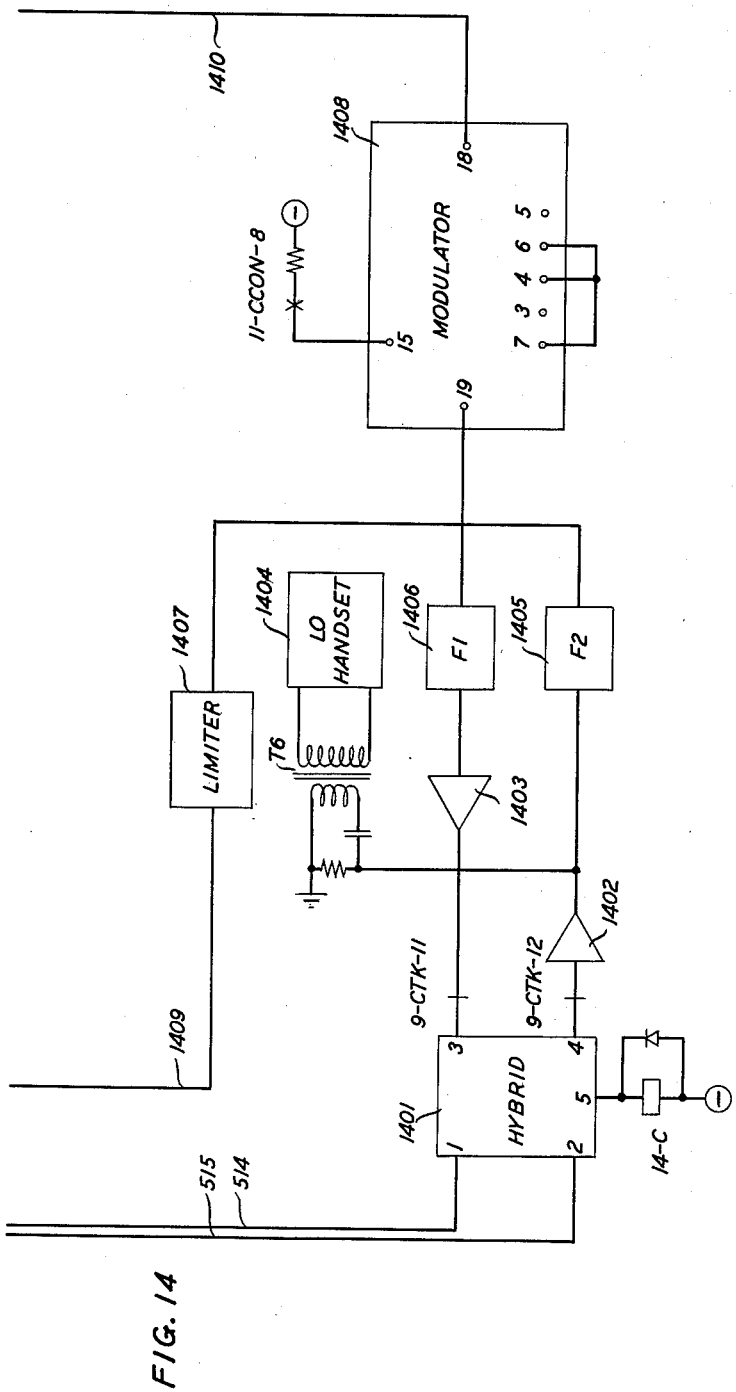

The subset associated with the answering cord circuit generally includes hybrid 601, amplifiers 602 and 603, $F_1$ filter 605, $F_2$ filter 606, limiter 607 and modulator 608, as shown in FIG. 6. In addition, the subset is provided with discriminator 1001, FIG. 10, timer 704, and appropriate relay control circuits, FIG. 7. It is noted that the answering cord subset is similar to the remote subscriber data set which is disclosed in the above-identified application of T. L. Doktor et al. In addition, a subset associated with the calling cord and substantially identical to the subset associated with the answering cord, is shown in FIG. 14 and portions of FIGS. 10 and 11.

During the normal idle marking condition negative battery is applied through input terminal 18 of modulator 608 to the base of transistor Q3K, as described hereinafter. Accordingly, in the marking condition transistor Q3K is conducting.

Assuming that the subset is in the originating mode whereby relay 4–AN is released, the base of oscillator transistor Q2K is connected to ground by way of the break contacts of contacts 4–AN–12, the break contacts of contacts 4–AN–11, inductor T15 and the collector-to-emitter path of transistor Q3K. If the subset is in the terminating mode, relay 4–AN is operated whereby ground is connected to the base of transistor Q2K by way of terminals 1 through 2 of inductor T16, the make contacts of contacts 4–AN–12 and 4–AN–11, terminals 2 to 1 of inductor T15 to the collector of transistor Q3K and then by way of the transistor to ground.

If a spacing signal is being transmitted, ground is applied to the base of transistor Q3K, as described hereinafter, and transistor Q3K is rendered nonconductive, thereby becoming an open circuit and consequently removing inductor T15 from ground to the base of transistor Q2K connection. Thus, keyer transistor Q3K either places inductor T15 in series between ground and the base of transistor Q2K or removes inductor T15, depending upon whether a mark or space condition is to be transmitted.

Transistor Q2K comprises an oscillator with the tank circuit including inductor T16 and capacitor C601. The basic frequency of this oscillator with relay 4–AN released is controlled by inductor T16 across capacitor C601 to oscillate in the lower $F_1$ frequency band. With relay 4–AN operated, the amount of inductance across capacitor C601 is reduced, resulting in a basic frequency in the higher $F_2$ frequency band. In addition, when a mark condition is to be transmitted, transistor Q3K is conducting and the oscillator tank is shunted by inductor T15, reducing the effective inductance and causing the oscillator to oscillate at a higher frequency in the basic frequency band. This corresponds to the frequency which was chosen to represent the marking condition. Conversely, when a space condition is to be transmitted, inductor T15 is removed from the tank circuit whereby the frequency is decreased in the basic frequency band. This corresponds to the spacing frequency.

The collector of transistor Q2K is connected to negative battery through make contacts 7–M–8 or make contacts 7–ACON–8, which contacts are closed at appropriate times to start the oscillator, as described hereinafter. The output of the oscillator is taken from the collector of transistor Q2K and proceeds through terminal 19 and the appropriate filter and amplifier to hybrid circuit 601.

Two filters are provided comprising a bandpass filter for the $F_1$ band, generally indicated by block 605, and a bandpass filter for the $F_2$ band, generally indicated by block 606. When the subset is in the originating mode relay 4–AOR is operated, as described hereinafter, $F_1$ filter 605 is put in the transmitting branch and $F_2$ filter 606 in the receiving branch. For this case the output of the oscillator is connected through the make contacts of contacts 4–AOR–11, $F_1$ filter 605, the make contacts of contacts 4–AOR–12, amplifier 603, and break contacts 9–ATK–11 to input terminal 3 of hybrid 601. When the subset is in the terminating mode, relay 4–AOR is released and the output of the oscillator is connected through the break contacts of contacts 4–AOR–11, $F_2$ filter 606, the break contacts of contacts 4–AOR–12, amplifier 603 and break contacts 9–ATK–11 to input terminal 3 of hybrid 601. Amplifier 603 is a power stage suitable to provide sufficient signal to drive the line and isolate the line from the bandpass filter.

Hybrid 601 provides isolation between the output of amplifier 603 and the input of amplifier 602. As is well known in the art, a signal applied to input terminal 3, for example, of hybrid 601, is applied across terminals 1 through 5 of coil T1, and consequently across terminals 1 hybrid 601. The output from terminals 1 and 2 of hybrid and 2, while being isolated from output terminal 4 of 601 proceeds to the cord circuit, as previously described.

An incoming signal applied across terminals 1 and 2 of hybrid 601 is applied to output terminal 4 of hybrid 601 and isolated from terminal 3, as is well known in the art. This incoming signal is fed through break contacts 9–ATK–12, and buffer amplifier 602 to contacts 4–AOR–2. If the subset is in the originating mode, relay 4–AOR is operated and the signal is applied by way of the make contacts of contacts 4–AOR–2, $F_2$ filter 606, and the make contacts of contacts 4–AOR–1 to the input of limiter 607. If the subset is in the terminating mode, relay 4–AOR is released and the signal is applied by way of the break contacts of contacts 4–AOR–2, $F_1$ filter 605 and the break contacts of contacts 4–AOR–1 to the input of limiter 607. Limiter 607, which is well known in the art, provides a limiting action for any signal which exceeds a predetermined amplitude. The output of limiter 607 is fed to input terminal 2 of discriminator 1001 by way of lead 609.

Figure 10:
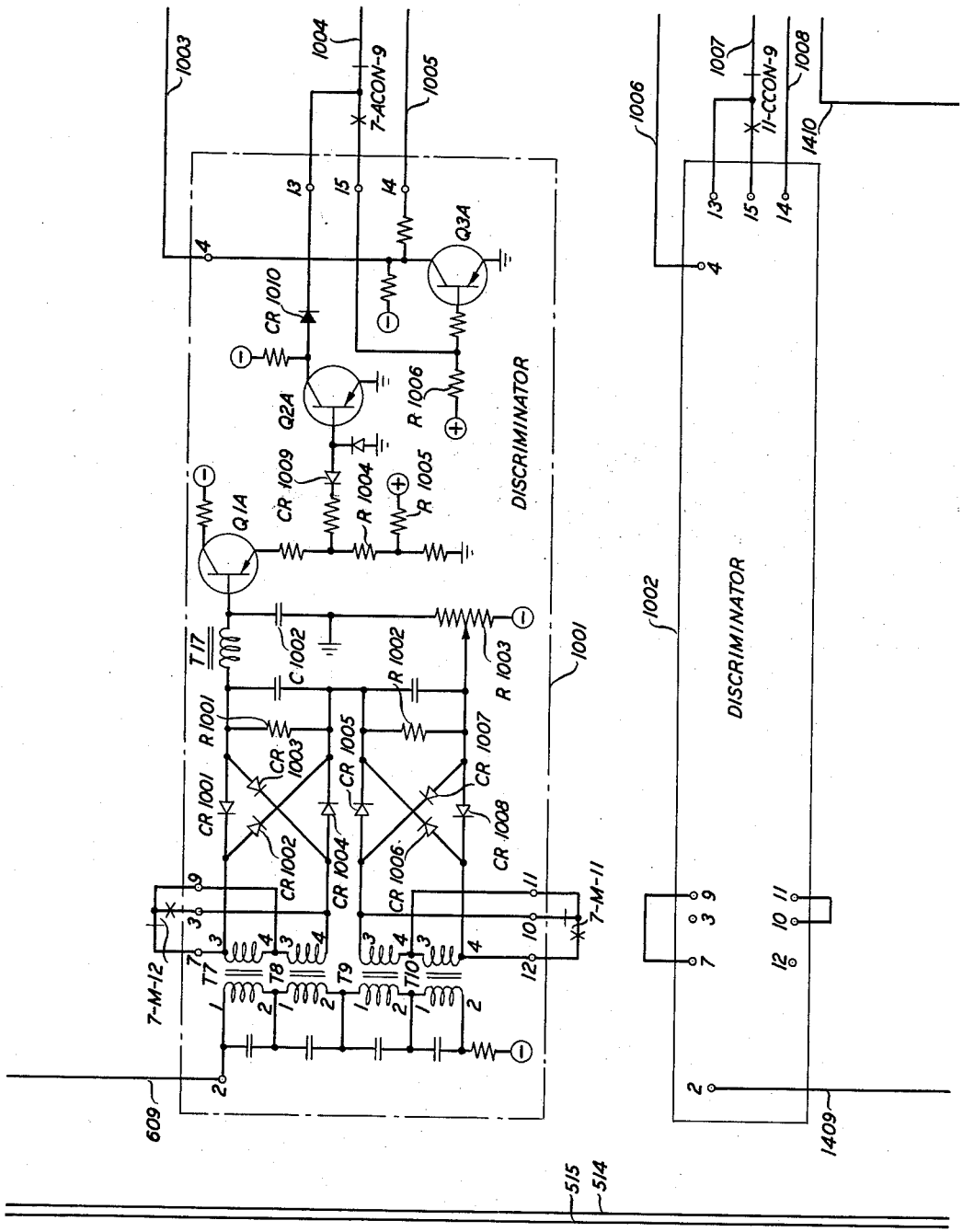
Figure 11:
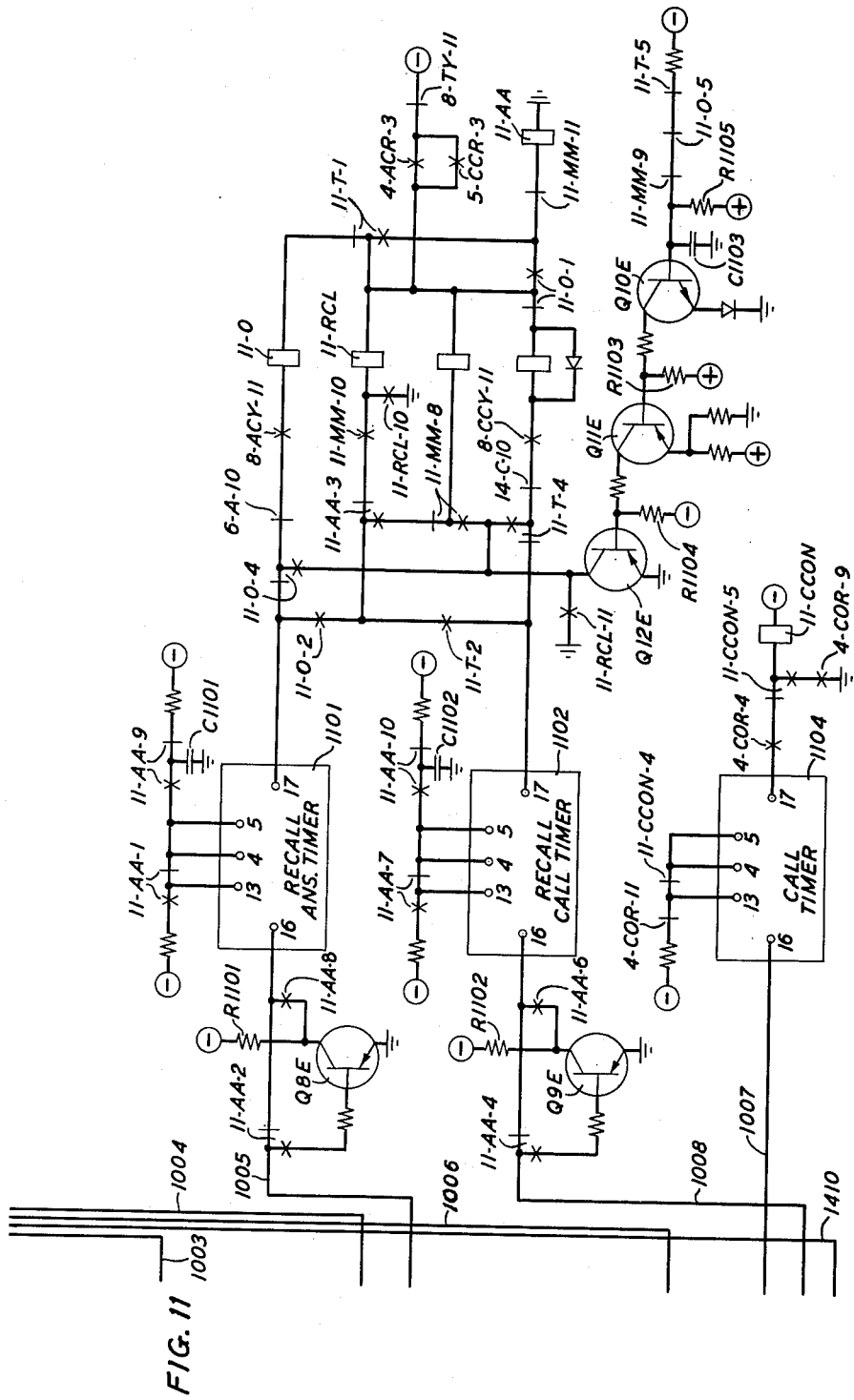

Discriminator 1001, which consists of four parallel tuned circuits in series composed of inductors T7, T8, T9 and T10, and the capacitors in shunt thereto as shown in FIG. 10, is driven by the output of limiter 607. The secondaries of the inductors are selected in series by means of contacts 7–M–12 and 7–M–11 which short-circuit the undesired secondaries. With a short-circuited secondary in one of the tuned circuits, the primary circuit resonance for that circuit is shifted sufficiently high in frequency so as to have no influence on the resonance of the remaining coils.

If the subset is in the terminating mode relay 7–M is operated, as described hereinafter, and the secondaries of inductors T8 and T10 are short-circuited. With the tuned circuits, including inductors T7 and T9, active, the discriminator will have the normal S-shaped curve effective in demodulating the $F_1$ frequency band whereby the space frequency excites the diode bridge which includes diodes CR1001 through CR1004 and the mark frequency excites the diode bridge which includes diodes CR1005 through CR1008. If the subset is in the originating mode, relay 7–M is released and the secondaries of inductors T7 and T9 are short-circuited. In this case the tuned circuits, which include inductors T8 and T10, are rendered active and the discriminator is tuned to the $F_2$ band.

Since the diode bridges are oppositely poled, a mark frequency coming into discriminator 1001 develops a positive voltage across load resistor R1002 and a space frequency coming into discriminator 1001 develops a negative voltage across load resistor R1001. In addition, in the absence of an incoming signal, potentiometer R1003 is adjusted to develop a negative spacing signal. These signals are fed through the low-pass filters comprising inductor T17 and shunting capacitor C1002, to the base of transistor amplifier stage Q1A.

Transistor Q1A is an emitter follower with load resistor R1004 in the emitter circuit. The application of a negative spacing signal to the base of transistor Q1A provides a negative signal across resistor R1004 which negative signal is applied by way of diode CR1009 to the base of transistor Q2A. Conversely, the positive marking signal applied to the base of transistor Q1A precludes the application of the negative signal across load resistor R1004 and the resultant application of positive battery by way of resistors R1005 and R1004 to diode CR1009 removes the negative signal applied to the base of transistor Q2A. Accordingly, transistor Q2A is rendered conductive in response to a space signal or in the absence of received signals and nonconductive in response to a marking signal.

The collector output of transistor Q2A is connected through Zener diode CR1010 to relay contacts 7–ACON–9. Before relay 7–ACON operates the output of transistor Q2A is fed through the break contacts of contacts 7–ACON–9, lead 1004, input terminal 2 of timer 704, and resistor R703 to the base of transistor Q5E. With this connection positive battery is applied to the base of transistor Q5E when the collector of transistor Q2A is in the spacing ground condition. When the collector of transistor Q2A goes to the negative marking condition, Zener diode CR1010 breaks down and the negative collector potential is applied to the base of transistor Q5E.

After relay 7–ACON operates, as described hereinafter, the collector output of transistor Q2A is connected through the make contacts of contacts 7–ACON–9 to the input of transistor Q3A. Accordingly, with this connection, a marking signal produces a negative voltage and a spacing signal produces a positive voltage at the base of transistor Q3A. When the base of transistor Q3A goes negative, it conducts, causing current to flow from ground through the emitter-to-collector path of transistor Q3A, output terminal 4 of discriminator 1001, lead 1003, and input terminal 2 of coupler 702. When transistor Q3A is cut off by a spacing signal, the ground is removed from lead 1003 and the resultant negative collector current is applied to input terminal 2 of coupler 702. Similarly, the collector output is fed through terminal 14 of discriminator 1001 and lead 1015 through contacts 11–AA–2, FIG. 11. The function provided by output terminal 14 of discriminator 1001 is described hereinafter.

Timer 704 performs several different functions depending upon the mode of operation of the data set. If the data set is in the terminating mode, the timing circuit will initialy time for a period of about one second, comprising a guard interval. During this interval the subset does not transmit any signal toward the remote subscriber. Following this interval the timer is switched to monitor for continuous marking frequency from the subscriber set and will time out after approximately one second of such marking signal. Once the marking signal time-out has occurred, relay 7–ACON operates, transferring the output of transistor Q2A to the input of transistor Q3A, as previously described. If the subset is in the originating mode of operation, the timing circuit will first look for the marking signal from the subscriber subset and then time-out after approximately one second, to operate relay 7–ACON.

Figure 7:
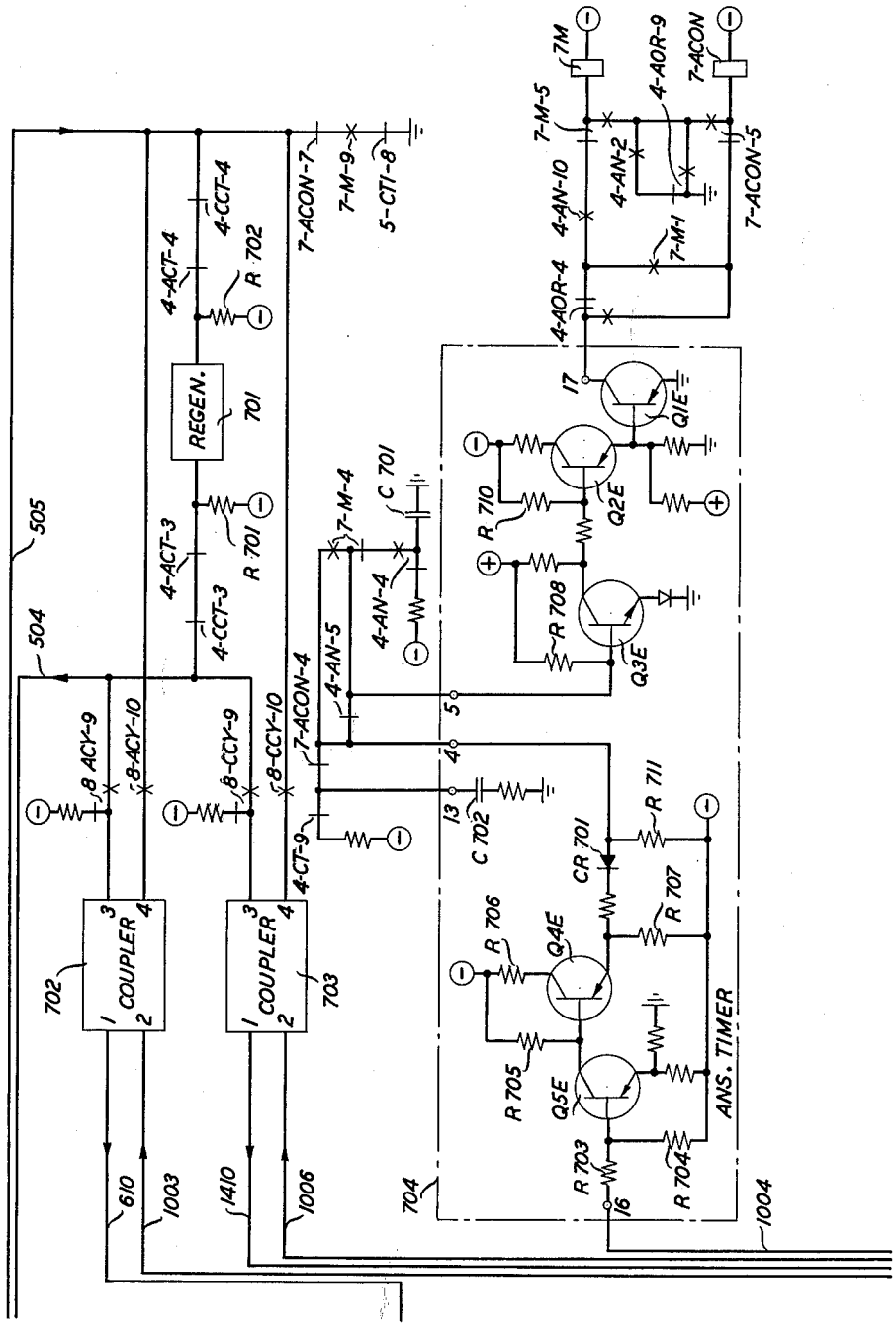

When a call is received, relay 4–AN is operated, as previously described, and the subset is placed in the terminating mode. In addition, relay 4–CT is operated, as previously described, and the subset is connected to the incoming trunk. The operation of relay 4–CT removes negative battery applied to the upper plate of capacitor C702, as shown in FIG. 7. The operation of relay 4–AN opens the connection between diode CR701 and the base of transistor Q3E through break contacts 5–AN–5. In addition, relay 4–AN operated disconnects the negative battery connected to capacitor C701 and connects capacitor C701 through the make contacts of contacts 4–AN–4, the break contacts of contacts 7–M–4 and terminal 5 of timer 704 to the base of transistor Q3E. At this time the negative charge previously applied to capacitor C701 is discharged through resistor R708 to positive battery until the base of transistor Q3E becomes positive. When transistor Q3E conducts, its resultant negative-going collector potential is applied to the base of transistor Q2E rendering the latter transistor conductive. The resultant negative emitter potential of transistor Q2E is applied to the base of transistor Q1E and transistor Q1E turns ON. This applies ground through the emitter-to-collector path of transistor Q1E, the break contacts of contacts 4–AOR–4, make contacts 4–AN–10, the break contacts of contacts 7–M–5 and the winding of relay 7–M to battery, operating the relay which locks through make contacts 4–AN–2 and the break contacts of contacts 4–AOR–9.

The operation of relay 7–M starts oscillator Q2K in modulator 608, as previously described. In addition, relay 7–M operated conditions discriminator 1001 to respond to signals in the $F_1$ frequency band, as previously described. With relay 7–M operated, capacitor C701 is disconnected from transistor Q3E by the opening of the break contacts of contacts 7–M–4 and the base of transistor Q3E is connected to diode CR701 through terminal 5 of timer 704, the make contacts of contacts 7–M–4 and terminal 4 of the timer. Since, at this time, no signals are being received and transistor Q2A is in the spacing condition, a positive signal is applied to the base of transistor Q5E rendering it nonconductive. The resultant application of negative battery through resistor R705 to the base of transistor Q4E renders the transistor conductive. The resultant negative-going emitter voltage of transistor Q4E is applied through diode CR701 to the base of transistor Q3E, as previously described, and also applied through break contacts 7–ACON–4 to capacitor C702. Accordingly, transistor Q3E is turned OFF, turning OFF, in turn, transistors Q2E and Q1E.

In response to the activation of oscillator Q2K, a continuous marking signal in the $F_2$ frequency band is transmitted to the calling subscriber. As disclosed in the above-identified T. L. Doktor et al. application, the remote subscriber subset monitors the continuous marking signal for a one-second interval and then returns a continuous marking signal in the $F_1$ frequency band. This signal is received by discriminator 1001, turning OFF transistor Q2A whereby a negative-going potential is applied to the base of timer transistor Q5E. The negative potential applied to the base of transistor Q5E renders it conductive and the consequent positive-going potential of its collector is applied to the base of transistor Q4E turning the latter transistor OFF. This removes the negative potential from diode CR701 whereby it ceases to conduct and a charging path is established for capacitor C702 toward positive battery through resistor R711 and through resistor R708. Accordingly, capacitor C702 will charge slowly until the base of transistor Q3E goes slightly positive, rendering the transistor conductive.

When transistor Q3E conducts, transistors Q2E and Q1E turn ON in turn. With transistor Q1E conductive, the ground at its emitter is applied through its collector and terminal 17 of timer 704, the break contacts of contacts 4–AOR–4, make contacts 7–M–1, the break contacts of contacts 7–ACON–5, and the winding of relay 7–ACON to battery, operating relay 7–ACON which locks through make contacts 4–AN–2 and the break contacts of contacts 4–AOR–9. Accordingly, the reception of a continuous mark of about one second turns ON transistor Q1E to operate relay 7–ACON.

Relay 7–ACON operated completes a supplemental path connecting negative battery to the collector of transistor oscillator Q2K through make contacts 7–ACON–8. Relay 7–ACON operated also transfers the output of transistor Q2A from timer 704 to the base of transistor Q3A by way of the make contacts of contacts 7–ACON–9 and terminal 15 of discriminator 1001, thus connecting the output of discriminator 1001 to input terminal 2 of coupler 702 by way of lead 1003. In addition, relay 7–ACON operated completes a path from the winding of relay 8–ACY through make contacts 7–ACON–6, the make contacts of contacts 8–TY–5, lead 802, and the normally closed splitting call key 1209, operating relay 8–ACY. With relay 8–ACY operated, output terminal 3 of coupler 702 is extended to lead 504 and through the make contacts of contacts 8–ACY–9 and lead 504 in turn extends through diode CR1202 to the base of keyer transistor Q2B, as previously described. In addition, input terminal 4 of coupler 702 is extended to lead 505 by way of the make contacts of contacts 8–ACY–10 and, as previously described, lead 505 extends to the output provided by transistor Q1B which transistor is controlled by the transmitted signals of teletypewriter 1202.

Coupler 702 functions to respond to the spacing ground signals generated by transistor Q1B by applying a positive spacing signal to lead 610 through output terminal 1, and, conversely, applying a negative marking signal on lead 610 in response to negative marking signals at the collector of transistor Q1B. In addition, coupler 702 responds to marking ground signals applied to input terminal 2 by generating negative marking signals at output terminal 4, and, conversely, generating spacing ground signals at output terminal 4 in response to negative spacing signals applied to input terminal 2. A function of coupler 702 is to maintain output terminal 1 in the marking condition when spacing signals are applied to input terminal 2. Couplers of this nature, sometimes called hub coupling circuits, are well known in the art. Such an arrangement suitable for use in this system is disclosed in an application of P. J. Marino, Serial No. 147,284 filed October 24, 1961, which issued as Patent 3,105,112 on September 24, 1963, and the disclosure of the Marino application is hereby incorporated herein as though fully set forth herein.

With the output of teletypewriter 1202 connected through coupler 702 to modulator 608 and the output of discriminator 1001 connected to keyer 1201 through coupler 702, telegraph communication between the switchboard operator and the calling subscriber can now proceed. Since the answering cord subset is in the terminating mode with relays 4–AN and 7–M operated and relay 4–AOR released, signals received from the subscriber in the $F_1$ band are detected by discriminator 1001 and the resultant D.-C. signals are applied through coupler 702 to the teletypewriter 1202 and D.-C. signals transmitted by teletypewriter 1202 are applied through coupler 702 to modulator 608 which converts the signals to frequency-shift signals in the $F_2$ band for transmission to the subscriber.

*Disconnecting the Teletypewriter Call*

The teletypewriter call may be disconnected by either the operator or the calling subscriber. The calling subscriber disconnects the call by initiating a clearing sequence as described in the above-mentioned T. L. Doktor et al. application. The switchboard operator disconnects the call by releasing the answer-type key and removing the answer cord.

Assuming now that the calling subscriber initiates the disconnect sequence, the calling subscriber set will return to the on-hook condition whereby trunk relay 1–LT releases. The release of trunk relay 1–LT releases relay 1–LT1 which, in turn, completes an operating path for relay 1–PTR through break contacts 1–LT1–5 and make contacts 1–SLT–1 and relay 1–PTR locks through make contacts 1–PTR–1 which shunts break contacts 1–LT1–5. Relay 1–PTR operated opens the previously-described operating path for relay 1–RV and relay 1–RV released removes the previously-described reverse battery condition returning telephone line 101 to its initial condition.

Returning now to the release of relay 1–LT1, a simplex battery circuit is completed for relay 6–A. This path may be traced through terminal 5 of hybrid 601, terminals 2 to 3 of coil T2, terminals 2 to 1 of coil T1 and terminal 1 of hybrid 601 to lead 407 and, in parallel thereto, through terminals 2 to 1 of coil T2, terminals 5 to 4 of coil T1 and terminal 2 of hybrid 601 to lead 408. As previously described, leads 407 and 408 extend to the tip and ring leads of the incoming trunk circuit, which leads further extend through make contacts of relay 1–CTT1, repeater coil T11, break contacts 1–LT1–10 and make contacts 1–CTT–2 to ground. This operates relay 6–A which, in turn, energizes answer lamp 902 through the break contacts of contacts 11–O–3, make contacts 4–AN–6 and the make contacts of contacts 6–A–9.

In response to the energization of answer lamp 902, the switchboard operator removes the answering cord from the incoming trunk and restores the answer-type key. The removal of the answering cord opens the sleeve circuit of the incoming trunk and cord circuits releasing relays 1–SLT and 4–SL. Relay 1–SLT released opens the previously-described operating path for relay 1–CTT and opens the previously-described locking paths for relays 1–CTT1 and 1–PTR and these relays release. This restores the incoming trunk circuit to the initial quiescent condition.

The release of relay 4–SL opens the previously-described locking path for relay 4–AN and relay 4–AN released opens the previously-described locking paths for relays 7–ACON and 7–M. In addition, relay 4–AN released opens the previously-described operating path for relay 4–ACR. The consequent release of relay 4–ACR opens the locking path of relay 4–CT. Relay 7–ACON released opens the previously-described operating path for relay 8–ACY.

The removal of the answering cord also opens the tip and ring leads breaking the previously-described simplex battery circuit whereby relay 6–A releases. This opens the previously-described energizing path for answer lamp 902 whereby lamp 902 is de-energized.

The release of the answer-type key opens the previously-described operating path for relay 8–TY and relay 8–TY, in turn, releases relay 8–TA. The release of relay 8–TA opens the operating path for relay 12–HD and relay 12–HD, in turn, releases relay 12–SR. Consequently, the cord circuit and position circuit are returned to the initial quiescent state.

*Originating a Call to a Teletypewriter Subscriber*

The operator at the switchboard may use either the answering cord or the calling cord to originate a call through the telephone network to a teletypewriter subscriber. When using the answering cord to originate a call, the answer-type key is operated and the answer cord is connected to an idle outgoing trunk. Conversely, when using the calling cord, the call-type key is operated and the calling cord is connected to an idle outgoing trunk. Assuming now that the switchboard operator uses the answering cord to originate a teletypewriter call, the operation of the answer-type key extends ground through normally open contacts 801 to the winding of relay 8–TY.

Relay 8–TY operated then completes an obvious operating path for relay 8–TA. In addition, relay 8–TY operated extends the input to transistor Q2B to lead 504 at the output of regenerator circuit 701 and extends the output of transistor Q1B to lead 505 at the input of regenerator 701, as previously described.

Relay 8–TA operated operates relay 12–HD and relay 5–AC, as previously described. Relay 12–HD, in turn, completes the operating path for relay 12–SR and removes the marking condition from the input of keyer 1201. The circuit now awaits the connection of the answering cord to an outgoing trunk circuit such as the outgoing trunk circuit shown in FIG. 2.

After operating the answer-type key, the switchboard operator connects the answer cord to the outgoing trunk circuit by inserting plug 4–ACD into jack 2–JO. This extends the ground on the sleeve lead of the outgoing trunk circuit applied through the winding of relay 2–SLO to the sleeve lead of the answering cord, which ground is extended through break contacts 4–SL–11, make contacts 5–AC–7 and the windings of the position circuit relays 12–MG1 and 12–B. Assuming that the outgoing trunk circuit is idle, relays 12–MG1 and 12–B operate followed by the operation of relay 2–SLO, as previously described. Relay 2–SLO operated completes an obvious operating path for the outgoing trunk lamps, such as lamps 202 and 203, indicating that the particular outgoing trunk is busy. Relay 2–SLO operated also connects negative battery to the ring lead of the outgoing trunk circuit through the low impedance of resistor R201, make contacts 2–SLO–3, and the break contacts of contacts 2–CTO–2.

Returning now to relay 12–B operated, relay 12–BB operates followed by the operation of relay 4–SL, as previously described. With relay 4–SL operated, the previously described operating paths for relays 12–MG1 and 12–B are opened, releasing the latter two relays, and relay 12–B released releases relay 12–BB. In addition, relay 4–SL operated extends the negative battery applied to the ring lead of the outgoing trunk circuit through the ring lead of the answering cord, the break contacts of contacts 4–CT–2, make contacts 4–SL–10, break contacts 4–ACR–4, make contacts 5–AC–12, lead 403, diode CR1201, the winding of marginal relay 12–MG and the winding of relay 12–TS to ground. Since, as previously described, this battery is provided through the low impedance of resistor R201, marginal relay 12–MG operates together with relay 12–TS, indicating that the cord circuit is attached to an outgoing trunk circuit.

The operation of relay 12–TS now opens the previously-described operating path for slow-to-release relay 12–SR and upon the release of relay 12–SR, ground is applied through break contacts 12–SR–5. Since relay 12–MG–1 is now operated, this ground is extended through the make contacts of contacts 12–MG–1, make contacts 12–TS–4, leads 1210 and 409, make contacts 5–AC–2, FIG. 4, break contacts 5–COR–7, break contacts 4–AN–3, and the break contacts of contacts 4–AOR–8 to the winding of relay 4–AOR, which operates and locks to ground through make contacts 4–SL–4. The operation of relay 4–AOR conditions the answering subset to operate in the originating mode, as previously described. Relay 4–AOR completes the operating path for relay 4–ACR through the break contacts of contacts 4–ACT–2, break contacts 4–AN–7, and the make contacts of contacts 4–AOR–9. Relay 4–AOR operated also completes the operating path for relay 5–RT through the break contacts of contacts 5–RT–9, make contacts 5–AC–8, and make contacts 4–AOR–7, operating relay 5–RT which locks through the make contacts of contacts 5–RT–9, break contacts 7–ACON–12, and make contacts 4–AOR–7. With relay 4–AOR operated, the operating path for relay 9–ATK is completed through make contacts 5–AC–9 and make contacts 4–AOR–3 and relay 9–ATK locks through the break contacts of contacts 9–ASU–6, break contacts 7–ACON–2 and make contacts 4–AOR–3.

The operation of relay 4–ACR extends negative battery through resistor R401, FIG. 4, make contacts 5–AC–4, the make contacts of contacts 4–ACR–2, and break contacts 4–CT–1 to the tip lead of the answering cord. This negative battery is extended to the tip lead of the outgoing trunk circuit and then through the break contacts of contacts 2–CTO–8 to the winding of relay 2–CTO which locks through make contacts 2–SLO–1. Relay 2–CTO operated extends the tip lead of the telephone line 201 to terminals 1 and 2 of repeater coil T12, the winding of relay 2–L, make contacts 2–CTO–12, and terminals 3 and 4 of repeater coil T12 to the ring lead of telephone line 201, closing the outgoing telephone line loop to indicate an off-hook condition to the telephone central office. In addition, relay 2–CTO operated removes the negative battery applied through resistor R201, and the break contacts of contacts 2–CTO–2 to the ring lead of the outgoing trunk circuit, whereby relays 12–MG and 12–TS release. The tip and ring leads of the outgoing trunk circuit are now extended through make contacts 2–CTO–4 and the make contacts of contacts 2–CTO–2, respectively, to repeater coil T12. Relay 12–TS released reoperates relay 12–SR and relay 12–SR, in turn, operates relay 4–CT, which locks through its own make contacts, as previously described. The operation of relay 4–CT now releases relay 5–AC, as previously described.

The operation of relay 4–CT extends the tip and ring leads of the answering cord to input terminals 1 and 2 of hybrid 601 and with relay 2–CTO operated, the answering subset is connected through to repeater coil T12 of the outgoing trunk circuit. Relay 9–ATK operated, however, opens break contacts 9–ATK–11 and 9–ATK–12, disconnecting hybrid 601 from modulator 608 and limiter 607. In addition, relay 9–ATK operated extends the tip lead of the answering cord through make contacts 9–ATK–4 and make contacts 8–TA–2 to lead 506, and extends the ring lead through make contacts 9–ATK–3 and make contacts 8–TA–3 to lead 507. This places the answering cord in the talking mode by extending the tip and ring leads through lead 506 and capacitor C1301 and 507 and capacitor 1307, respectively, to the multifrequency pulsing key circuit and the telephone set shown in FIG. 13.

When the telephone office sender is ready, battery on line 201 is reversed, operating relay 2–L in the outgoing trunk circuit, and relay 2–L, in turn, provides a sender-ready signal in the cord circuit by extending ground through make contacts 2–L–2 to terminals 6 and 7 of repeater coil T12. This simplex ground is further extended through the tip and ring leads of the answering cord to input terminals 1 and 2 of hybrid 601 and then by way of terminal 5 of hybrid 601 to the winding of relay 6–A. Relay 6–A operated completes an energizing path for answer lamp 902 through the break contacts of contacts 11–O–3, make contacts 4–AOR–5, the break contacts of contacts 9–ASU–8 and the make contacts of contacts 6–A–9. The energization of lamp 902 advises the operator that the telephone office sender is ready and the operator may key pulse out the appropriate digits for the desired teletypewriter subscriber, as described hereinafter.

The operator initiates the key pulsing of the digits by depressing the KP key, completing an obvious path for relay 13–KP2 through normally-open contacts 1301 and relay 13–KP2 operates and then releases after the release of the KP key. The operation of relay 13–KP2 completes an operating path for relay 12–KP through the break contacts of contacts 12–MF–3, make contacts 13–KP2–8, lead 1211, make contacts 8–TA–8, FIG. 8, diode CR801, break contacts 9–LP–2, the make contacts of contacts 5–RT–11, break contacts 9–ASU–9, break contacts 7–ACON–11 and make contacts 4–AOR–6 to ground, operating relay 12–KP. Relay 12–KP operated extends the ground applied through the break contacts of contacts 12–MF–3 through make contacts 12–KP–2 and make contacts 13–KP2–4 to the winding of relay 12–F and relay 12–F locks to ground on lead 1211 through make contacts 12–F–12. The operation of relay 12–F completes a temporary locking path for relay 12–KP through make contacts 12–F–11 and break contacts 12–KP1–7.

Figure 8:
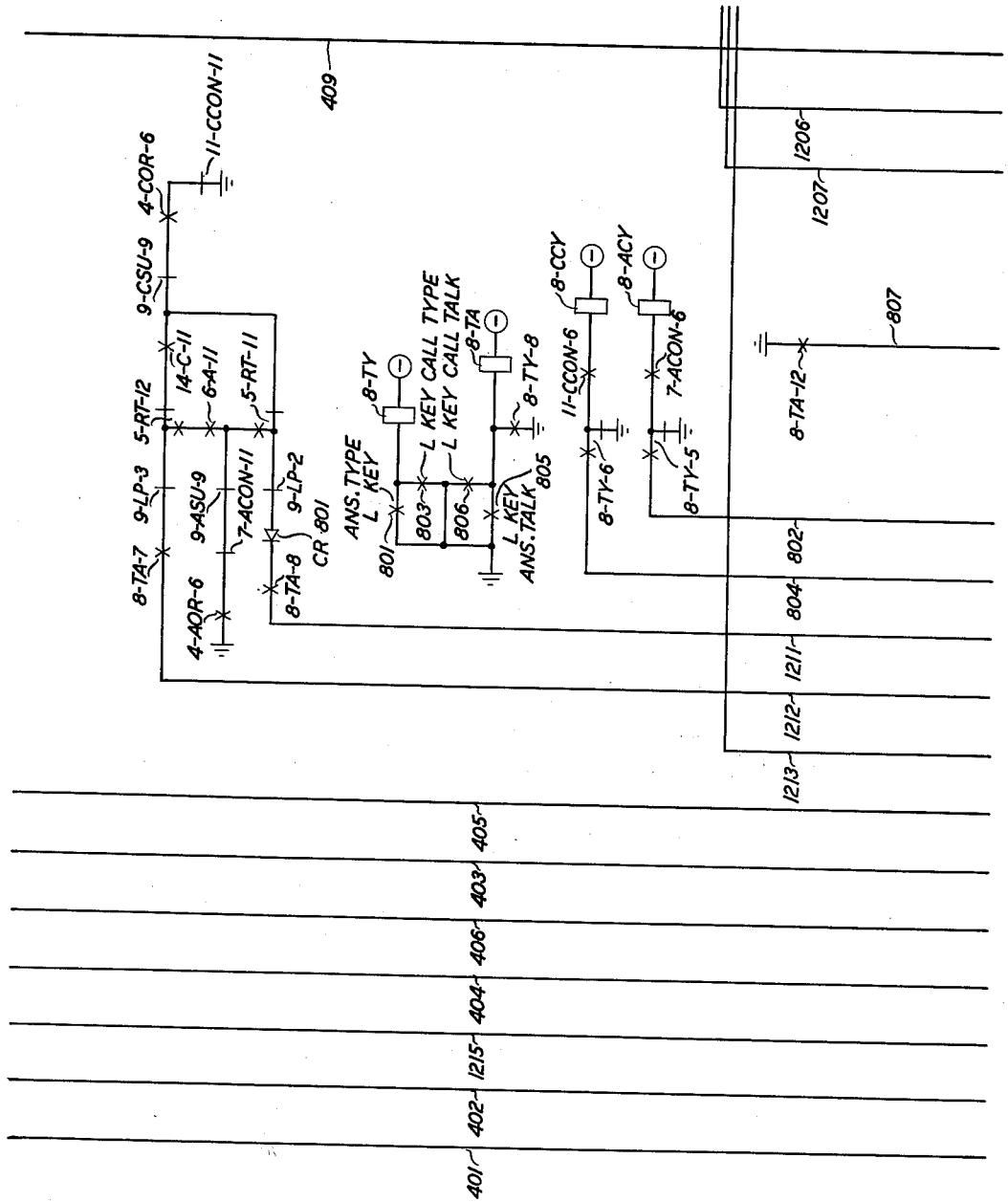
Figure 9:
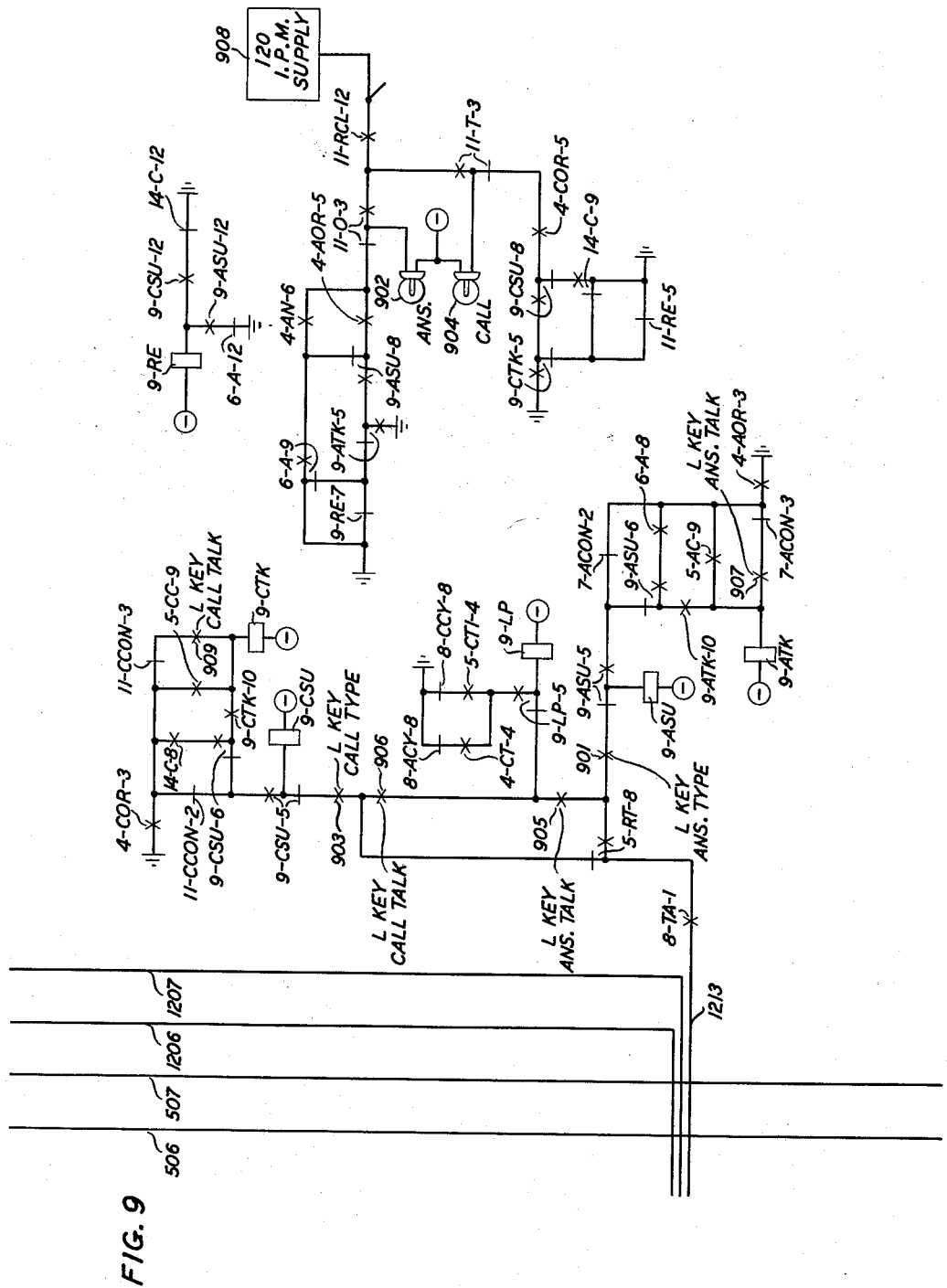

With relay 12–F operated, the winding of relay 12–KP1 is extended through make contacts 12–KP–6, make contacts 12–F–1, lead 1212, make contacts 8–TA–7, FIG. 8, break contacts 9–LP–3, the make contacts of contacts 5–RT–12, make contacts 6–A–11, break contacts 9–ASU–9, break contacts 7–ACON–11 and make contacts 4–AOR–6 to ground, operating relay 12–KP1. In addition, relay 12–F operated completes an obvious energizing path for lamp 1303 indicating to the operator that the multifrequency pulsing key circuit is connected to the cord circuit. This connection may be traced through capacitor C1301 and the make contacts of contacts 12–F–9 and capacitor C1302 and the make contacts of contacts 12–F–7 to repeater coil T21 which, in turn, is connected to the multifrequency pulsing circuit.

The multifrequency pulsing key circuit includes a plurality of digit keys, each having a first and second normally-open pair of contacts, generally indicated by blocks 1307 and 1308, and a multifrequency supply circuit generally indicated by block 1305. Multifrequency supply circuit 1305, which is well known in the art, provides selective tone signals at various output leads which may comprise, for example, a 700 cycle tone at lead T0, a 900 cycle tone at lead T1, an 1100 cycle tone at lead T2, a 1300 cycle tone at lead T4, a 1500 cycle tone at lead T7, and a 1700 cycle tone at lead T10. Thus, with relay 12–KP operated, lead T10 is extended through the make contacts of contacts 12–KP1–10 and lead T2 is extended through the make contacts of contacts 12–KP1–4 to repeater coil T21, whereby the 1100 cycle and 1700 cycle tones are transmitted through the cord circuit to the telephone central office to enable the central office receiver.

Relay 12–KP1 operated opens the temporary locking path for slow-to-release relay 12–KP and when relay 13–KP2 releases, relay 12–KP releases in turn and the operating path for relay 12–KP1 is opened. The consequent release of relay 12–KP1 extends ground through make contacts 12–F–11, the break contacts of contacts 12–KD–10, and break contacts 12–KP–8 and 12–KP1–3 to the winding of relay 12–MF, operating relay 12–MF which locks through the break contacts of relays 12–KP1 and 12–KP, make contacts 12–MF–8 and make contacts 12–F–11. Relay 12–MF operated with relay 12–KP1 released, extends terminal 4 of repeater coil T21 to the contacts of the digit keys shown in block 1308 by way of the break contacts of contacts 12–KP1–4 and make contacts 12–MF–11 and extends terminal 3 of repeater coil T21 to the contacts of the digit keys shown in block 1307 by way of the break contacts of contacts 12–KP1–10 and the make contacts of contacts 12–MF–12. In addition, relay 12–MF operated energizes lamp 1304 through the make contacts of contacts 12–MF–1 indicating to the operator that the digit key pulsing may now proceed.

If the operator depresses a digit key before lamp 1304 is energized, this is an error in the key pulsing sequence and will be visually indicated to the operator by the flashing of lamp 1304. Under this condition, the only recourse available to the operator is to pull down the cord and start over again.

Figure 13:
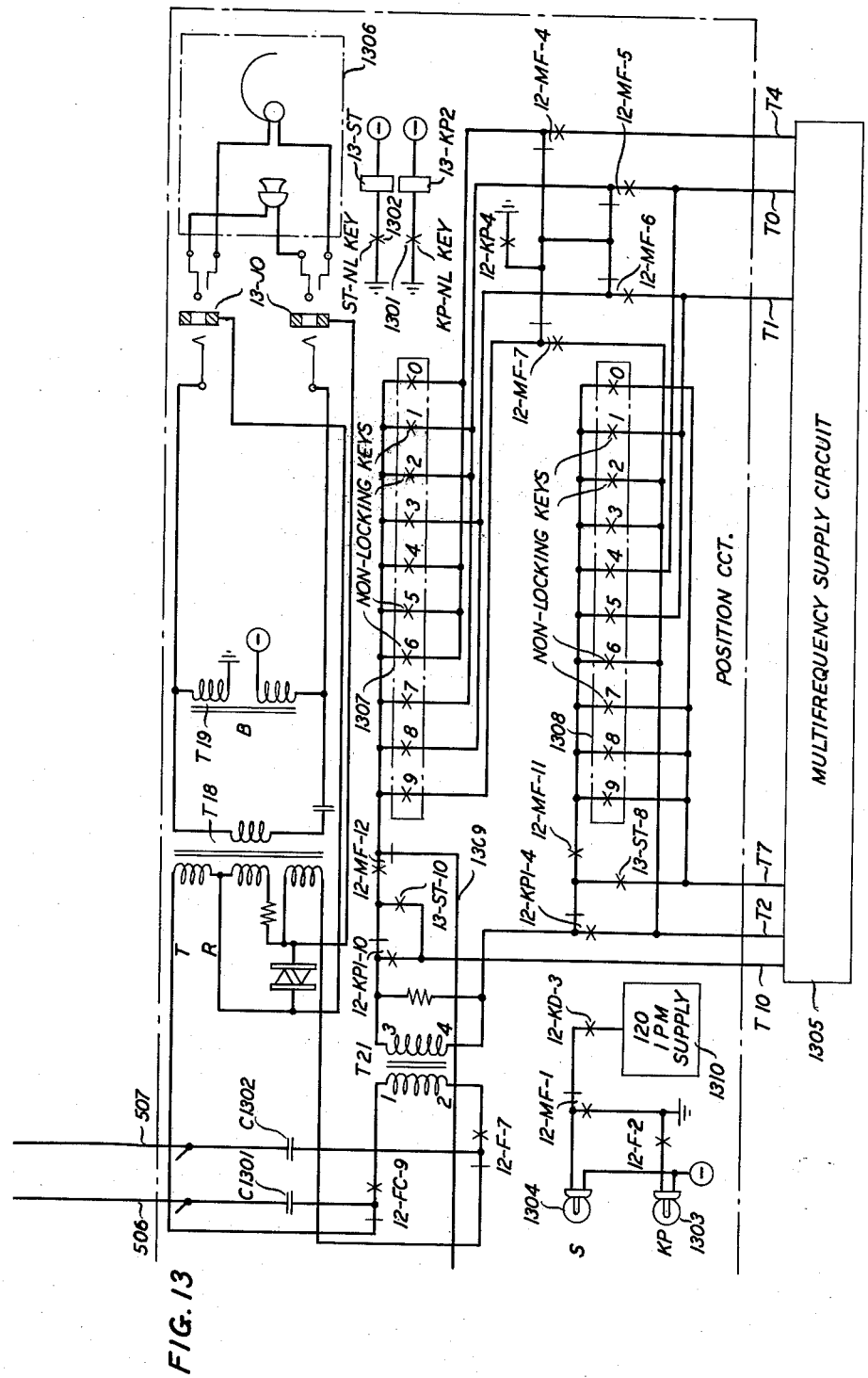

Assuming the digit 4 key is depressed before lamp 1304 is energized, relay 12–KP is still operated and relay 12–MF is released, thus applying ground through make contacts 12–KP–4, FIG. 13, the break contacts of contacts 12–MF–4, the contacts of digit key 4, shown in block 1307, the break contacts of contacts 12–MF–12, and lead 1309 to the winding of relay 12–KD. Similarly, the depression of digit key 1 extends ground through make contacts 12–KP–4, the break contacts of contacts 12–MF–5, the contacts of digit key 1, shown in block 1307, and the break contacts of contacts 12–MF–12 and the depression of digit key 7 extends ground through the break contacts of contacts 12–MF–6 to lead 1309. The ground applied to relay 12–KD operates the relay which locks through the make contacts of contacts 12–KD–10 and make contacts 12–F–11. Relay 12–KD operated opens the previously-described operating path for relay 12–MF and extends the energizing path for lamp 1304 through the break contacts of contacts 12–MF–1 and make contacts 12–KD–3 to a 120-interruptions-per-minute supply, generally indicated by block 1310. The operator is thus advised to pull down the cord and restore the answer-type key. This releases all the relays in the switchboard including relay 8–TA and relay 8–TA released releases relay 12–F which, in turn, releases relay 12–KD. The release of relay 12–KD extinguishes lamp 1304, whereupon the operator again attempts to call the teletypewriter subscriber.

Assuming that the operator depresses the digit key after the operation of relay 12–MF is energized, a pair of tones are applied to repeater coil T21 in accordance with the particular digit key operated. A typical example comprises the operation of digit key zero which extends 1500 cycle tone through lead T7, digit key zero contact shown in block 1308, make contacts 12–MF–11 and the break contacts of contacts 12–KP1–4 to terminal 4 of coil T21 and extends 1300 cycle tone through lead T4, the make contacts of contacts 12–MF–4, the contacts of digit key zero shown in block 1307, the make contacts of contacts 12–MF–12 and the break contacts of contacts 12–KP1–10 to terminal 3 of coil T21. Similarly, the operation of any one of the other digit keys selectively applies two tone frequencies to coil T21.

After the desired digits have been key pulsed, key 1302 is depressed momentarily operating slow-to-release relay 13–ST. This extends ground through make contacts 12–ST–4, FIG. 12, lead 1213, make contacts 8–TA–1, FIG. 9, the make contacts of contacts 5–TR–8, answer-type key contacts 901 and the break contacts of contacts 9–ASU–5 to the winding of relay 9–ASU, which locks by way of break contacts 7–ACON–2 and make contacts 4–AOR–3. In addition, relay 13–ST operated completes a momentary holding path for relay 12–F through make contacts 13–ST–6. Relay 13–ST operated also extends 1700 cycle tone and 1500 cycle tone to repeater coil T21. These paths may be traced from lead T10 through make contacts 13–ST–10 and the break contacts of contacts 12–KP1–10 to terminal 3 and from lead T17 through make contacts 13–ST–8 and the break contacts of contacts 12–KP1–4 to terminal 4. This advises the office multifrequency receiver that the digit pulsing is completed.

Relay 9–ASU operated transfers the holding path for relay 9–ATK through the make contacts of contacts 9–ASU–6 and make contacts 6–A–8. In addition, relay 9–ASU operated transfers the energizing path for lamp 902 through the make contacts of contacts 9–ASU–8 and the make contacts of contacts 9–ATK–5.

The subsequent release of relay 13–ST together with the operation of relay 9–ASU opens the locking and holding paths for relay 12–F, and the relay releases. Relay 12–F released extinguishes lamp 1303 and opens the energizing path for relay 12–MF and relay 12–MF, in turn, extinguishes lamp 1304. In addition, relay 12–F released extends leads 506 and 507 across repeater coil T18 by way of the break contacts of contacts 12–F–9 and contacts 12–F–7, respectively, thus extending the talk path to jacks 13–JO whereby the operator may monitor the progress of the call by inserting plugs associated with the telephone set, generally indicated by block 1306, into jacks 13–JO.

The central office responds to the digit key pulsing by selecting and ringing the teletypewriter subscriber and, as disclosed in the above-identified application of T. L. Doktor et al., the teletypewriter subscriber answers the call by going off-hook and transmitting a marking signal in the $F_2$ frequency band after the termination of a guard interval.

When the teletypewriter subscriber goes off-hook, the telephone central office reverses the line battery to release relay 2–L in the outgoing trunk circuit and relay 2–L, in turn, removes the simplex ground applied to repeater coil T12. This releases relay 6–A which, in turn, opens the previously-described holding paths for relay 9–ATK. The release of relay 6–A completes an operating path for relay 9–RE through break contacts 6–A–12 and make contacts 9–ASU–12. The function of relay 9–RE is described hereinafter. Relay 9–ATK released opens the talk path extending to leads 506 and 507 and recompletes the paths extending hybrid 601 to amplifiers 602 and 603 thus re-enabling the answering cord subset. Since the output of amplifier 602 is also applied across coil T5 which, in turn, is connected to a listen-only handset, generally indicated by block 604, the operator may now monitor the supervisory tones provided during the connecting sequence. This permits the operator to hear whether the received off-hook signal is received from a telephone subscriber reached in error. In this event, the operator will hear the voice of the telephone subscriber and will then operate the cord circuit to the talking condition, as described hereinafter, to explain that an error was made and then disconnect to return the circuit to normal and make a new attempt.

When the marking frequency in the $F_2$ frequency band has been received for one second, timer 704 times out, as previously described, rendering transistor Q1E conductive, whereby current is applied through the make contacts of contacts 4–AOR–4 and the break contacts of contacts 7–ACON–5 to the winding of relay 7–ACON whereby relay 7–ACON operates and locks, as previously described. When relay 7–ACON operates, the discriminator output is transferred through lead 1003 to input terminal 2 of coupler 702, the collector of transistor Q2K is connected to negative battery to transmit a marking signal in the $F_1$ frequency band, and the operating path for relay 8–ACY is completed in the same manner as previously described. Relay 7–ACON operated also opens the previously-described operating path for relay 5–RT and the latter relay releases. In addition, relay 7–ACON operated opens the previously-described locking path for relay 9–ASU and relay 9–ASU released releases relay 9–RE and extingushes answer lamp 902. With relay 8–ACY operated, coupler 702 is connected to teletypewriter 1202 whereby the switchboard operator may communicate with the teletypewriter subscriber.

The teletypewriter call may be disconnected by either the operator or the called subscriber. If the called subscriber initiates the disconnect sequence the called subscriber set will return to the on-hook condition whereby the telephone office reverses the battery on telephone line 201. This again operates relay 2–L and relay 2–L operated again applies simplex ground to the winding of relay 6–A which, in turn, energizes lamp 902 in the same manner as previously described. In response to the energization of answer lamp 902, the switchboard operator removes the answer cord from the incoming trunk and restores the answer-type key. The removal of the answering cord opens the sleeve circuit of the outgoing trunk and cord circuits, releasing relays 4–SL and 2–SLO. Relay 2–SLO released opens the previously-described locking path for relay 2–CTO and relay 2–CTO, in turn, disconnects the tip lead of telephone line 201 from the ring lead signaling a disconnect from the telephone office and releasing relay 2–L. This restores the outgoing trunk circuit to the initial quiescent conditon. The release of relay 4–SL opens the previously-described locking path for relay 4–AOR and relay 4–AOR, in turn, releases relay 7–ACON. The release of the answer-type key opens the previously-described operating path for relay 8–TY and the cord circuit is returned to the initial quiescent state in the same manner as previously described.

The switchboard operator disconnects the call by removing the answering cord and restoring the answer-type key. This releases relays 4–SL, 2–SLO and 8–TY, as previously described. Relay 2–SLO releases relay 2–CTO and relay 2–CTO, in turn, opens telephone line 201, signaling a disconnect to the telephone office. All other relays in the cord circuit release in the same manner as previously described.

*Completing a Teletypewriter Call With the Calling Cord*

The switchboard operator may use the calling cord to originate a call to a teletypewriter subscriber. The operator operates the call-type key and connects the calling cord into an idle outgoing trunk to initiate the call.

The operation of the call-type key completes an obvious energizing path for relay 8–TY through contacts 803 and relay 8–TY operated operates relay 8–TA. With relay 8–TA operated, relay 12–HD operates and relay 12–SR operates, in turn, as previously described. The operation of relay 12–HD removes the marking signal from keyer 1201 through break contacts 12–HD–2 and the operation of relay 8–TY connects teletypewriter 1202 to leads 504 and 505, as previously described.

With relay 8–TA operated, an operating path is completed for relay 5–CC through break contacts 5–AC–10, break contacts 5–CT1–7, contacts 508 of the call-type key and make contacts 8–TA–6. Relay 5–CC operated then extends the sleeve lead of the calling cord through break contacts 5–SL1–11, make contacts 5–CC–7 and lead 509 to lead 401, and lead 401, in turn, extends to the windings of relays 12-MG1 and 12–B, as previously described. Accordingly, the sensing of ground through the winding of relay 2–SLO in the outgoing trunk circuit operates both relays 12–MG1 and 12–B and relay 12–MG1 operated operates relay 2–SLO, as previously described.

The operation of relay 12–B operates relay 12–BB and relay 12–BB, in turn, completes the operating path for relay 5–SL1 through make contacts 5–CC–6, leads 510 and 402, and the make contacts of contacts 12–BB–10, FIG. 12, and relay 5–SL1 locks to ground on the sleeve lead. With relay 5–SL1 operated, the ground on the sleeve lead applied through break contacts 5–SL1–11 to lead 401 is removed, releasing relays 12–MG1 and 12–B and relay 12–B, in turn, releases relay 12–BB, as previously described.

Relay 5–SL1 operated now extends the ring lead of the calling cord through the break contacts of contacts 5–CT1–2, make contacts 5–SL1–10, make contacts 5–CC–12 and lead 511 to lead 403 and lead 403, in turn, extends through the winding of marginal relay 12–MG to relay 12–TS, as previously described. Accordingly, due to the sensing of low impedance resistor R201 in the outgoing trunk circuit, both relays 12–MG and 12–TS operate and relay 12–TS releases relay 12–SR, as previously described.

When relay 12–SR releases, an operating path is completed for relay 4–COR through the break contacts of contacts 4–COR–8, make contacts 5–CC–2, break contacts 5–RT–10, lead 409, lead 1210, FIG. 12, make contacts 12–TS–4, the make contacts of contacts 12–MG–1 and break contacts 12–SR–5, and relay 4–COR locks to ground through make contacts 5–SL1–4. The operation of relay 4–COR conditions the operation of the calling subset shown in FIG. 14 and a portion of FIGS. 10 and 11. In addition, the operation of relay 4–COR completes the operating path for relay 5–CCR through the break contacts of contacts 4–CCT–2 and make contacts 4–COR–10. Relay 4–COR operated also completes the operating path for relay 9–CTK through the make contacts 5–CC–9, and make contacts 4–COR–3 and relay 9–CTK locks through the break contacts of contacts 9–CSU–6, break contacts 11–CCON–2 and make contacts 4–COR–3.

Relay 5–CCR operated extends the tip lead of the calling cord through break contacts of contacts 5–CTL–1, the make contacts of contacts 5–CCR–2, make contacts 5–CC–4 and resistor R501 to negative battery. Accordingly, negative battery is applied through the tip lead in the outgoing trunk circuit and the break contacts of contacts 2–CTO–8 to the winding of relay 2–CTO which locks through make contacts 2–SLO–1. Relay 2–CTO operated connects the tip and ring leads of telephone line 201 signaling an off-hook condition to the telephone office, connects the tip and ring leads of the trunk circuit to coil T12, and removes the negative battery from the ring lead of the outgoing trunk circuit. This releases relays 12–MG and 12–TS, as previously described, and relay 12–TS, in turn, reoperates relay 12–SR. With relay 12–SR operated, a path is extended from the winding of relay 5–CT1 through make contacts 5–CCR–1, the break contacts of contacts 5–CT1–5, make contacts 5–CC–5, leads 513 and 405, and make contacts 12–SR–10, FIG. 12, to ground, operating relay 5–CT1 which locks through make contacts 5–CCR–1 and the make contacts of contacts 5–CT1–5.

The operation of relay 5–CT1 extends the tip and ring leads of the calling cord to the talk path which comprises leads 506 and 507 and also extends the tip and ring leads to terminals 1 and 2 of hybrid 1401 of the answering subset. The paths from the tip and ring leads to leads 506 and 507 may be traced from the tip lead through the make contacts of contacts 5–CT1–1, break contacts 4–CCT–6, make contacts 5–CTK–4 and make contacts 8–TA–2 to lead 506 and from the ring lead through the make contacts of contacts 5–CT1–2, the break contacts of contacts 4–CCT–5, make contacts 9–CTK–3 and make contacts 8–TA–3 to lead 507. Similarly, the path to terminals 1 and 2 of hybrid 1401 may be traced through the break contacts of relay 4–CCT–6 to leads 514 and 515, respectively, and leads 514 and 515, in turn, extend to terminals 1 and 2 of hybrid 1401. At this time, relay 5–CT1 operated opens the previously-described operating path for relay 5–CC and the latter relay releases.

When the telephone office sender is ready, the battery on telephone line 201 is reversed, operating relay 2–L. Relay 2–L operated applies simplex ground to repeater coil T12 which ground is applied to terminals 1 and 2 of hybrid 1401 and then by way of terminal 5 of hybrid 1401 to the winding of relay 14–C. Relay 14–C operated completes an energizing path for call lamp 904 through the break contacts of contacts 11–T–3, make contacts 4–COR–5, the break contacts of contacts 9–CSU–8 and the make contacts of contacts 14–C–9, energizing lamp 904, whereby the operator is advised that the sender is ready.

When the operator notes the energization of lamp 904, the KP key is depressed, energizing relay 13–KP2 while the key is maintained depressed through contacts 1301.

The operation of relay 13–KP2 completes the operating path for relay 12–KP through the break contacts of contacts 12–MF–3, make contacts 13–KP2–8, lead 1211, make contacts 8–TA–8, FIG. 8, diode CR801, break contacts 9–LP–2, the break contacts of contacts 5–RT–11, break contacts 9–CSU–9, make contacts 4–COR–6, and break contacts 11–CCON–11. Relay 12–KP, in turn, operates relay 12–F by extending the ground on the winding of relay 12–KP through make contacts 12–KP–2, and make contacts 13–KP2–4 to the winding of relay 12–F operating this relay which locks to ground on lead 1211 by way of make contacts 12–F–12. Relay 12–F operated lights lamp 1303, as previously described, indicating that the multifrequency pulsing key circuit is connected to the cord circuit. In addition, relay 12–F completes the operating path for relay 12–KP1 through make contacts 12–KP–6, make contacts 12–F–1, lead 1212, make contacts 8–TA–7, FIG. 8, break contacts 9–LP–3, the break contacts of contacts 5–RT–12, make contacts 14–C–11, break contacts 9–CSU–9, make contacts 4–COR–6 and break contacts 11–CCON–11. Relay 12–KP1 operated connects 1700 and 1100 cycle tone across repeater coil T21, as previously described, enabling the multifrequency receiver in the telephone office.

When relay 13–KP2 releases, the operating path for relay 12–KP is opened and relay 12–KP, in turn, releases relay 12–KP1, as previously described. With relays 12–KP and 12–KP1 released, the previously-described operating path for relay 12–MF is completed and relay 12–MF operated lights lamp 1304, indicating that the sender is ready and the operator may key pulse the digits. In addition, relay 12–MF operated extends repeater coil T21 to the digit keys, as previously described. The operator now proceeds with the digit key pulsing and then depresses the ST key, energizing slow-to-release relay 13–ST through contacts 13–ST. Relay 13–ST operated connects 1700 cycle and 1500 cycle tone across repeater coil T21, as previously described. In addition, relay 13–ST operated extends ground to lead 1213 through make contacts 13–ST–4 and lead 1213, in turn, extends to the winding of relay 9–CSU through make contacts 8–TA–1, the break contacts of contacts 5–RT–8, contacts 903 of the call-type key, and the break contacts of contacts 9–CSU–5, operating relay 9–CSU which locks through the make contacts of contacts 9–CSU–5, break contacts 11–CCON–2, and make contacts 4–COR–3. Relay 9–CSU operated transfers the locking path for relay 9–CTK through the make contacts of contacts 9–CSU–6 and make contacts 14–C–8. Relay 9–CSU operated also transfers the energizing path for lamp 904 through the make contacts of contacts 9–CSU–8 and make contacts 9–CTK–5.

The subsequent release of relay 13–ST with relay 9–CSU operated releases relay 12–F which, in turn, releases relay 12–MF, as previously described, whereby lamps 1303 and 1304 are extinguished.

When the called subscriber answers the call, the off-hook signal reverses the battery across telephone line 201, releasing relay 2–L. Relay 2–L released removes the simplex ground whereby relay 14–C releases. Relay 14–C released opens the previously-described locking path for relay 9–CTK and the latter relay releases. The release of relay 9–CTK transfers the energizing path for lamp 904 through the break contacts of contacts 9–CTK–5 and break contacts 14–C–9. In addition, relay 14–C released completes an operating path for relay 9–RE through make contacts 9–CSU and break contacts 14–C–12.

After the appropriate guard interval the subscriber subset sends a continuous marking tone in the $F_2$ frequency band which tone is applied to terminals 1 and 2 of hybrid 1401 of the answering subset. The answering subset generally includes hybrid 1401, amplifiers 1402 and 1403, filters 1405 and 1406, limiter 1407 and modulator 1408, as shown in FIG. 14, discriminator 1002, FIG. 10, and timer 1104, FIG. 11, which components are arranged in the same manner as hybrid 601, amplifiers 602 and 603, filters 605 and 606, limiter 607, modulator 608, discriminator 1001 and timer 704 in the answering subset. With relay 9–CTK released, incoming signals are applied through terminal 4 of hybrid 1401 and amplifier 1402 to $F_2$ filter 1405 and across terminals 2 and 3 of repeater coil T6 which repeats the signals to the listen-only handset, generally indicated by block 1404. $F_2$ filter 1405 passes the signals through limiter 1407 which, in turn, applies the signals to input terminal 2 of discriminator 1002, by way of lead 1409.

In discriminator 1002, terminal 10 is connected to terminal 11 and terminal 7 is connected to terminal 9. Accordingly, the coils corresponding to coils T7 and T9 in discriminator 1001 are short-circuited whereby discriminator 1002 responds to signals in the $F_2$ frequency band. With relay 11-CCON released, output signals provided at terminal 13 at discriminator 1002 are applied to input terminal 16 of timer 1104 through the break contacts of contacts 11-CCON-9, and lead 1007. After the operation of relay 11-CCON, as described hereinafter, the signals provided at terminal 13 are extended to terminal 15 through the make contacts of contacts 11-CCON-9 and these signals are, in turn, inverted by the transistor corresponding to transistor Q3A in discriminator 1001 and then applied to lead 1008 through output terminal 14 and to input terminal 2 of coupler 703 through output terminal 4 and lead 1006. Coupler 703, which is substantially identical to coupler 702, is connected by way of output terminal 1 and lead 1410 to input terminal 18 of modulator 1408. Since terminals 7, 4 and 6 are interconnected in modulator 1408, terminals 1 through 3 of the inductor corresponding to inductor T15 in modulator 608 shunts the oscillator tank circuit whereby the oscillator is conditioned to transmit in the $F_1$ frequency band. Accordingly, when relay 11-CCON operates to provide negative battery to terminal 15, the modulator oscillator is turned ON and signals are transmitted through output terminal 19, $F_1$ filter 1406, and amplifier 1403 to terminal 3 of hybrid 1401, providing signals across terminals 1 and 2 of hybrid 1401.

Recalling now that the answering subset initially transmits a marking signal which signal is received by discriminator 1002, the negative potential is applied to input terminal 16 of timer 1104 by output terminal 13 of discriminator 1002. This turns ON the transistor corresponding to transistor Q4E in timer 704 whereby the capacitor corresponding to capacitor C702 charges for about one second to turn ON the transistors corresponding to transistors Q3E, Q2E and Q1E in timer 704. The resultant current at terminal 17 is applied to the winding of relay 11-CCON through make contacts 4-COR-4 and break contacts 11-CCON-5, opening relay 11-CCON which locks through make contacts 4-COR-9.

Relay 11-CCON operated transfers the output of discriminator 1002 to terminals 4 and 14 and initiates the operation of the oscillator in modulator 1408, whereby a marking signal is returned to the answering subset. Relay 11-CCON operated completes the operating path for relay 8-CCY through make contacts 11-CCON-6, make contacts of contacts 8-TY-6, lead 804, and answer splitting key 1214, FIG. 12. In addition, relay 11-CCON operated opens the previously-described locking path for relay 9-CSU and operating path for relay 9-RE and these latter relays release. The release of relay 9-CSU opens the previously-described energizing path for call lamp 904, extinguishing the lamp.

With relay 8-CCY operated, output terminal 3 of coupler 703 is extended to lead 504 through make contacts 8-CCY-9 and lead 504 extends through diode CR1202 to the base of keyer transistor Q2B, as previously described. In addition, input terminal 4 of coupler 703 is extended to lead 505 by way of make contacts 8-CCY-10 and lead 505, in turn, extends to the output provided by transistor Q1B, which transistor is controlled by the transmitted signals of teletypewriter 1202, as previously described. With the output of teletypewriter 1202 connected through coupler 703 to modulator 1408, and the output of discriminator 1002 connected to keyer 1201 through coupler 703, telegraph communication between the switchboard operator and the called subscriber may now proceed.

The calling subscriber may terminate the call by initiating the disconnect sequence which returns the subscriber set to the on-hook condition. This reverses the battery across telephone line 201, reoperating relay 2-L. The operation of relay 2-L reapplies the simplex ground to repeater coil T12, whereby relay 14-C operates. The operation of relay 14-C completes the energizing path for call lamp 904 through the break contacts of contacts 11-T-3, make contacts 4-COR-5, the break contacts of contacts 9-ASU-8, and the make contacts of contacts 14-C-9. In response to the energization of call lamp 904 the switchboard operator removes the calling cord from the outgoing trunk and restores the call-type key. The removal of the cord releases relays 5-SL1 and 2-SLO. Relay 2-SLO released releases relay 2-CTO and relay 2-CTO, in turn, disconnects the tip lead of telephone line 201 from the ring lead, thus signaling a disconnect signal and releasing relay 2-L. This restores the outgoing trunk circuit to the initial quiescent condition. The release of relay 5-SL1 releases relay 4-COR and relay 4-COR released releases relays 11-CCON and 4-CCR. Relay 11-CCON, in turn, releases relay 8-CCY. In addition, the removal of the answering cord opens the simplex battery circuit, whereby relay 14-C releases. This opens the previously-described energizing path for call lamp 904, whereby the lamp is de-energized.

The release of the call-type key opens the previously-described operating path for relay 8-TY and relay 8-TY, in turn, releases relay 8-TA. The release of relay 8-TA releases relays 12-HD and 12-SR, in turn. Accordingly, the cord circuit is returned to the initial quiescent condition.

Assuming the switchboard operator initiates the disconnect by releasing the call-type key and removing the calling cord from the outgoing trunk, relays TA, 5-SL1 and 2-SLO are released in the same manner as previously described. With relay 2-SLO released the outgoing trunk circuit relays are returned to the initial quiescent condition, and with relays 5-SL1 and 8-TY released, the other cord circuit relays are released in the same manner as previously described.

*Typical Service Request*

A typical service request requires the switchboard operator to answer a call from a teletypewriter subscriber using the answering cord and then establish a connection between this teletypewriter subscriber and another teletypewriter subscriber using the calling cord.

When the calling subscriber requires assistance, the incoming trunk circuit lamp is energized and the operator connects the answering cord to service the request. In addition, the answer-type key is operated whereby the calling subscriber is connected to the position circuit whereby the operator may communicate with the subscriber's subset, as previously described.

After the operator has determined that the calling subscriber desires to be connected with another teletypewriter subscriber, contacts 1209 of the splitting key is opened by the operator thus opening the previously-described operating path for relay 8-ACY. With relay 8-ACY released, terminal 3 of coupler 702 is disconnected from lead 504, and the negative marking potential is reapplied to terminal 3 through the break contacts of contacts 8-ACY-9. In addition, terminal 4 of coupler 702 is disconnected from lead 505. Accordingly, the conection from the cord circuit to the calling subscriber is maintained but the position circuit and regenerator 701 are disconnected from the answering subset.

The operator now proceeds to call the other teletypewriter subscriber by inserting the calling cord into an idle outgoing trunk and operating the call-type key. This connects the outgoing trunk circuit to the position circuit and the operator key pulses the appropriate digits when the sender-ready signal is received.

When the called subscriber responds to the call and the connecting sequence is concluded, relay 8-CCY operates, as previously described. The operator then restores key 1209, reoperating relay 8-ACY. At this time the teletypewriter subscribers may communicate directly. The calling subscriber, during the communication interval, transmits to the answering subset. These signals are applied to input terminal 2 of coupler 702, as previously described, and then through output terminal 4 of coupler 702, make contacts ACY-10, lead 505, break contacts 4-CCT-4 and break contacts 4-ACT-4 to the input of regenerator 701. Regenerator 701 regenerates these input signals and applies them through break contacts 4-ACT-3, break contacts 4-CCT-3, lead 504 and make contacts 8-CCY-9 to input terminal 3 of coupler 703. The signals from the calling subscriber applied to input terminal 3 of coupler 703 are provided at output terminal 1 and then through lead 1410 to input terminal 18 of modulator 1408. Thus, the signals are transmitted to the called subscriber in the $F_1$ frequency band.

Signals received from the called subscriber in the $F_2$ frequency band are applied to discriminator 1002, as previously described, and the D.-C. output signals from terminal 4 of discriminator 1002 are provided through lead 1006 to input terminal 2 of coupler 703. With output terminal 4 of coupler 703 connected through make contacts 8-CCY-10, lead 505, break contacts 4-CCT-4 and break contacts 4-ACT-4 to the input of regenerator 701, these regenerated signals are passed through break contacts 4-ACT-3, break contacts 4-CCT-3 and make contacts 8-ACY-9 to input terminal 3 of coupler 702. Coupler 702, in turn, passes the signals through output terminal 1 and lead 610 to input terminal 18 of modulator 608. Accordingly, the called subscriber's teletypewriter signals are retransmitted to the called subscriber in the $F_2$ frequency band. In addition, the D.-C. signals from the two subscribers are applied by way of lead 505 to teletypewriter 1202 in the operator's position circuit.

After this connection has been completed the operator may restore the answer-type key and the call-type key to disconnect the position circuit from the cord circuit and thereby render the position circuit available for connection to other cord circuits. The release of these keys release relay 8-TY, as previously described. With relay 8-TY released, relay 8-TA is released, releasing, in turn, relays 12-HD and 12-SR. In addition, the release of relays 8-TY and 8-TA disconnects leads 1206 and 1207 from leads 504 and 505 and opens leads 1211 and 1212 in the cord circuit. With relay 8-TY released, relay 8-ACY locks through the break contacts of contacts 8-TY-5 and relay 8-CCY locks through the break contacts of contacts 8-TY-6. The talk paths which comprise leads 506 and 507 are also opened by the release of relay 8-TA. Thus, with relay 12-SR and relay 12-HD released, the position circuit is returned to the initial quiescent condition and is disconnected from the cord circuit.

*Subscriber Recall*

When a subscriber wants to recall the operator into the connection, the subscriber transmits a spacing break signal. The reception of this signal by the cord subset functions to flash the cord lamp to notify the operator that a recall is requested.

Assuming that the calling subscriber transmits the break signal, this prolonged spacing signal turns OFF transistor Q3A in discriminator 1001, as previously described, applying negative battery through output terminal 14 to lead 1005 and then through the break contacts of contacts 11-AA-2 to input terminal 16 of the recall answer timer, generally indicated by block 1101. Recall answer timer 1101 and recall call timer 1102 are arranged in the same manner as answer timer 704. Accordingly, the negative potential applied to input lead 16 of timer 1101 turns OFF the transistor corresponding to transistor Q4E in timer 704 whereby the capacitor corresponding to capacitor C702 charges to turn ON the transistor corresponding to transistor Q3E. Ground is thus applied to output terminal 17 of timer 1101 which ground passes through the break contacts of contacts 11-O-4, break contacts 6-A-10, make contacts 8-ACY-11, winding of relay 11-O, the break contacts of contacts 11-T-1, make contacts 4-ACR-3, and 5-CCR-3 in shunt thereto, and break contacts 8-TY-11, operating relay 11-O which locks to the collector ground of transistor Q12E through the make contacts of contacts 11-O-4.

In the normal quiescent condition, negative battery is applied through break contacts 11-T-5, 11-O-5, and 11-MM-9 to the base of transistor Q10E. This negative potential applied to the base of transistor Q10E maintains the transistor in the nonconductive condition whereby positive potential is applied through resistor R1103 to the base of transistor Q11E maintaining transistor Q11E in a nonconductive condition. With transistor Q11E in the nonconductive condition, negative battery applied to the base of transistor Q12E through resistor R1104 turns the transistor ON whereby the locking ground for relay 11-O is provided through the emitter-to-collector path. The operation of relay 11-O removes the negative battery applied to the base of transistor Q10E and capacitor C1103 proceeds to charge to positive battery through resistor R1105. The values of capacitor C1103 and resistor R1105 are arranged so that capacitor C1103 requires a charging time of approximately seven seconds to turn transistor Q10E ON.

Returning now to relay 11-O operated, an operating path is completed for relay 11-AA through break contacts 11-MM-1, the make contacts of contacts 11-O-1, make contacts 4-ACR-3 or 5-CCR-3 in shunt thereto, and break contacts 8-TY-11. Relay 11-AA operated disconnects lead 1005 from the input of timer 1101, extends lead 1005 through the make contacts of contacts 11-AA-2 to the base of transistor Q8E and extends the collector of transistor Q8E to input terminal 16 through make contacts 11-AA-8. With relay 11-AA operated, negative battery is applied through the make contacts of contacts 11-AA-1 to the capacitor corresponding to capacitor C703 in timer 704 and the transistor which corresponds to transistor Q3E in timer 704 is disconnected from the timing capacitor by the opening of the break contacts of contacts 11-AA-1. In addition, relay 11-AA operated disconnects negative battery from capacitor C1101 and connects capacitor C1101 through the make contacts of contacts 11-AA-9 to the base of the transistor corresponding to transistor Q3E in timer 704. Accordingly, the ground is removed from output terminal 17 of timer 1101 and the output signals from discriminator 1001 are applied to input terminal 16 of timer 1101 in an inverted form.

Assuming the terminal portion of the first break signal is still being received, negative battery is applied to lead 1015, as previously described, whereby transistor Q8E is turned ON and its collector ground is provided to input terminal 16 of timer 1101. This precludes the timing of timer 1101 in the same manner as previously described for timer 704.

When the first break signal terminates and marking is received, ground is applied to lead 1005 by discriminator 1001, as previously described, turning OFF transistor Q8E. Negative battery is thus applied to input terminal 16 through resistor R1101 and make contacts 11-AA-8. Timer 1101 consequently starts to time and at the end of the timing period thereof, ground is reapplied to terminal 17 and extended through make contacts 11-O-2, the make contacts of contacts 11-AA-3, the break contacts of contacts 11-MM-8, the winding of relay 11-MM, make contacts 4-ACR-3 or 5-CCR-3 in shunt thereto, and break contacts 8-TY-11 to negative battery operating relay 11-MM which locks to the collector ground of transistor Q12E through the make contacts of contacts 11-MM-8. Relay 11-MM operated further opens the path connecting negative battery to the base of transistor Q10E by way of break contacts 11-MM-9. Relay 11-MM operated also opens the previously-described operating path for relay 11-AA whereby the latter relay releases. The release of relay 11-AA re-extends lead 1005 to input terminal 16 of timer 1101, disconnects capacitor C1101 from the base of the transistor corresponding to transistor Q3E in timer 704 and reconnects the capacitor corresponding to capacitor C702 in timer 704 to the timer circuit. Accordingly, timer 1101 is again arranged to monitor for a spacing signal.

When the second break signal is received negative battery is reapplied to input terminal 16 of timer 1101 and at the end of the timing period thereof ground is reapplied to output terminal 17. This ground is extended through make contacts 11-O-2, the break contacts of contacts 11-AA-3, make contacts 11-MM-10, the winding of relay 11-RCL, make contacts 4-ACR-3 or 5-CCR-3 in shunt thereto and break contacts 8-TY-11 to negative battery operating relay 11-RCL which locks to ground through make contacts 11-RCL-10. Relay 11-RCL operated applies ground to the collector of transistor Q12E through make contacts 11-RCL-11, thereby supplementing the locking paths of relays 11-O and 11-MM. In addition, relay 11-RCL operated extends the 120-interruptions-per-minute supply, generally indicated by block 908, to answer lamp 902 through make contacts 11-RCL-12 and the make contacts of contacts 11-O-3 indicating to the operator that a recall is desired by the subscriber attached to the answering cord.

Assuming now that the subscriber attached to the calling cord sends the two break signals, the first break signal applied through lead 1008, the break contacts of contacts 11-AA-4 to input terminal 16 of timer 1102 initiates the operation of the timer which, at the end of the timing period thereof, applies ground through output terminal 17, the break contacts of contacts 11-T-4, break contacts 14-C-10, make contacts 8-CCY-11, the winding of relay 11-T, the break contacts of contacts 11-O-1, make contacts 4-ACR-3 or 5-CCR-3 in shunt thereto, and break contacts 8-TY-11 to negative battery operating relay 11-T which locks to the collector ground of transistor Q12E through the make contacts of contacts 11-T-4. Relay 11-T operated removes the negative battery from the base of transistor Q10E whereby capacitor C1103 starts to charge, as previously described. In addition, relay 11-T operated extends the winding of relay 11-AA through break contacts 11-MM-11, the make contacts of contacts 11-T-1, make contacts 4-ACR-3 or 5-CCR-3 in shunt thereto, and break contacts 8-TY-11 to negative battery, operating relay 11-AA. Relay 11-AA operated disconnects lead 1008 from input terminal 16 of timer 1102 and extends lead 1008 to the base of transistor Q9E through the make contacts of contacts 11-AA-4. The collector of transistor Q9E is now extended to input terminal 16 through make contacts 11-AA-6. In addition, relay 11-AA operated disconnects the capacitor corresponding to capacitor C702 in timer 704 from the timing circuit and connects capacitor C1102 in the timing circuit in the same manner as previously described for timer 1101. Accordingly, timer 1102 monitors for a marking signal and, at the termination of the first break signal, timer 1102 begins to time. Thus, at the end of the timing period thereof, ground is applied to output terminal 17 of timer 1104 and this ground is extended through make contacts 11-T-2, the make contacts of contacts 11-AA-3 and the break contacts of contacts 11-MM-8 to the winding of relay 11-MM operating the relay, which locks, as previously described. The operation of relay 11-MM maintains negative battery disconnected from the base of transistor Q10E and releases relay 11-AA, as previously described. With relay 11-AA released, timer 1102 monitors for the second break signal and after the reception of the signal times out to reapply ground to terminal 17. This ground is extended through make contacts 11-T-2, the break contacts of contacts 11-AA-3, and make contacts 11-MM-10 to the winding of relay 11-RCL, which locks, as previously described. Relay 11-RCL operated applies ground to the collector of transistor Q12E, as previously described, and extends 120-interruptions-per-minute supply 908 to call lamp 904 through make contacts 11-RCL-12 and the make contacts of contacts 11-T-3 to flash call lamp 904.

The operator answers the recall by operating the answer-type key or the call-type key. This operates relay 8-TY which, in turn, operates relays 8-TA, 12-HD and 12-SR. With relays 8-TA and 8-TY operated, teletypewriter 1202 is again extended to leads 504 and 505, as previously described. The operation of relay 8-TY opens the previously-described locking paths for relays 11-O, 11-T, 11-MM and 11-RCL and the operated ones of these relays release. The release of relay 11-RCL opens the previously-described energizing paths for answer lamp 902 and call lamp 904 and the lamp that was flashing is extinguished. In addition, relay 11-RCL released removes the ground applied to the collector of transistor Q12E and the release of relays 11-O, 11-T and 11-MM and reapplies negative battery to the base of transistor Q10E. The operator may now communicate with either or both of the subscribers since teletypewriter 1202 is connected to leads 504 and 505. In addition, the operator may open key 1214 releasing relay 8-CCY thereby communicating only with the subscriber attached to the answering cord, as previously described, or, in the alternative, open key 1209 releasing relay 8-ACY to communicate only with the subscriber attached to the calling cord.

Assuming now that the subscriber does not desire to recall the operator, but has transmitted one break signal in the communication interval, the reception of the one break signal operates relays 11-O and 11-T, as previously described, thus removing the negative battery from the base of transistor Q10E. If another break signal is now received within approximately seven seconds, capacitor C1103 charges sufficiently to turn transistor Q10E ON. The consequent negative-going collector potential of transistor Q10E is applied to the base of transistor Q11E, turning the latter transistor ON. The resultant positive potential at the collector of transistor Q11E is applied to the base of transistor Q12E, turning this transistor OFF. This removes the locking ground for relays 11-O, 11-T and 11-MM whereby the operated ones of these relays release, restoring the circuit to the initial quiescent state.

*Conference Call Completion*

With a teletypewriter subscriber connected to the cord circuit through either the answering cord or the calling cord, a conference call may be completed with either opposite cord. The completion of a call in a conference connection simply requires the operator to insert the appropriate cord into a conference trunk. Frequency identifying marks are not required for this completion and the procedure may be repeated for as many conference calls as required by utilizing a cord circuit for each teletypewriter subscriber in the conference connection.

Figure 3:
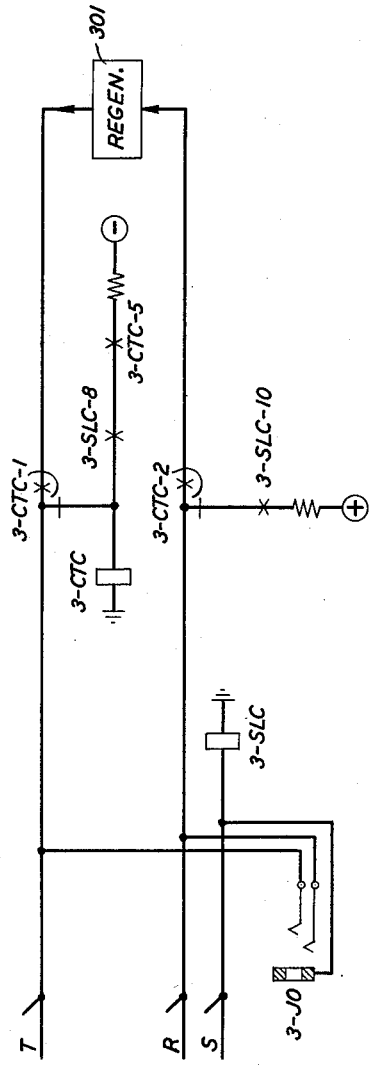

Assuming now that a teletypewriter subscriber is connected to the answering cord, to complete a conference connection the operator depresses the call-type key and inserts the calling cord into a jack of the conference circuit, which circuit is generally shown in FIG. 3. With the call-type key depressed, relays 8-TY, 8-TA, 12-SD and 12-SR operate if these relays were not previously operated by the connection of the subscriber to the answering cord and with relay 8-TA operated, relay 5-CC operates. The insertion of the calling cord plug 5-CCD into a conference circuit jack, such as jack 3-JO, extends ground through the winding of relay 3-SLC to the sleeve lead of the calling cord. This ground, as previously described, extends through leads 509 and 401 to the winding of relays 12-MG1 and 12-B. Accordingly, relays 12-MG1 and 12-B operate together with relay 3-SLC. Relay 3-SLC operated extends positive battery to the ring lead of the conference circuit through make contacts 3-SLC-10 and the break contacts of contacts 3-CTC-2. Relay 12-B operated operates, in turn, relay 12-BB and relay 12-BB operates relay 5-SL1 which locks to ground on the sleeve lead, as previously described.

The operation of relay 5-SL1 extends the positive battery applied to the ring lead of the conference circuit through the ring lead of the calling cord whereby the positive battery is applied through leads 511 and 403, as previously described. This positive battery is thus extended through diode CR1203 to the winding of relay 12–CS, operating the relay. In addition, the operation of relay 5–SL1 releases relays 12–MG1 and 12–B which, in turn, releases relay 12–BB, as previously described.

The operation of relay 12–CS indicates a connection to the conference circuit. With relay 12–CS operated, the previously-described operating path for relay 12–SR is opened, and slow-to-release relay 12–SR starts to release. When relay 12–SR releases ground is extended through break contacts 12–SR–7, FIG. 12, make contacts 12–CS–4, lead 1215, make contacts 5–CC–3, FIG. 4, to the winding of relay 4–CCT which locks through make contacts 5–SL1–4. With relay 5–CCT operated, regenerator 701 is detached from leads 504 and 505, which leads extend to the regenerator through break contacts 4–CCT–3 and 4–CCT–4, respectively, as previously described. In addition, relay 4–CCT operated completes the operating path for relay 5–CCR through the make contacts of contacts 4–CCT–2 and the break contacts of contacts 4–COR–10.

The operation of relay 5–CCR extends negative battery to the tip lead of the calling cord through resistor R501, make contacts 5–CC–4, the make contacts of contacts 5–CCR–2 and the break contacts of contacts 5–CT1–1. This negative battery is thus extended to the tip lead of the conference circuit and then through the break contacts of contacts 3–CTC–1 to the winding of relay 3–CTC which locks through make contacts 3–SLC–8. Relay 3–CTC operated extends the ring lead of the conference circuit through the make contacts of contacts 3–CTC–2 to the input of the conference regenerator, generally indicated by block 301, which regenerator regenerates the signals applied thereto and passes the signals through the make contacts of contacts 3–CTC–1 to the tip lead of the conference circuit. In addition, relay 3–CTC operated removes the positive battery from the ring lead of the conference circuit whereby relay 12–CS releases, operating, in turn, relay 12–SR.

The reoperation of relay 12–SR with relay 5–CCR operated extends ground to the winding of relay 5–CT1, as previously described, and relay 5–CT1 opens the previously-described operating path for relay 5–CC. The operation of relay 5–CT1 now cuts through the calling cord to leads 504 and 505 and since the answering cord is connected to a trunk circuit whereby relay 8–ACY is operated, leads 504 and 505 are further extended to coupler 702. The path from the calling cord to leads 504 and 505 may be traced from the tip lead of the calling cord through the make contacts of contacts 5–CT1–1 and the make contacts of contacts 4–CCT–6 and from the ring lead of the calling cord through the make contacts of contacts 5–CT1–2 and the make contacts of contacts 4–CCT–5. Thus, with the teletypewriter subscriber connected to coupler 702 through the answering cord and the answering cord subset, this connection is further extended to the conference circuit, whereby signals from the teletypewriter subscriber are applied to lead 505, as previously described, and then to the ring leads of the calling cord and the conference circuit and these signals are then applied to the tip lead of the conference circuit by way of regenerator 301. Similarly, signals received from other teletypewriter subscribers attached to the conference circuit pass through regenerator 301 to the tip lead of the conference circuit and are then passed through the tip lead of the calling cord, lead 504 and coupler 702 to modulator 608 of the answering cord subset, whereby the signals are transmitted to the teletypewriter subscriber.

The conference connection may be released by removing the calling cord. This opens the sleeve leads whereby relays 5–SL1 releases. The release of relay 5–SL1 releases relay 4–CCT which, in turn, releases relay 5–CCR and relay 5–CCR releases relay 5–CT1. This restores the cord circuit to the initial condition wherein the teletypewriter subscriber is connected to the answering cord.

When all the cords are disconnected from the conference circuit, relay 3–SLC releases opening the previously-described locking path for relay 3–CTC. The release of relay 3–CTC together with the release of relay 3–SLC restores the conference circuit to the initial quiescent state.

Assuming that the teletypewriter subscriber is connected to the calling cord, the operator inserts the answering cord into the conference circuit and depresses the answer-type key to complete the conference connection. With relays 8–TY, 8–TA, 5–AC, 12–HD and 12–SR operated, as previously described, the ground applied through the winding of relay 3–SLC to the sleeve lead of the conference circuit is extended to the winding of relays 12–MG1 and 12–B whereby these relays operate. The operation of relay 12–B operates relay 12–BB and with relay 5–AC operated, relay 12–BB operates relay 4–SL which locks to ground on the sleeve lead of the answering cord, as previously described. The operation of relay 4–SL with relay 3–SLC operated extends the previous-described positive battery on the ring lead of the conference circuit through lead 403 and diode CR1203 to the winding of relay 12–CS. In addition, relay 4–SL releases relays 12–MG1 and 12–B which, in turn, releases relay 12–BB, as previously described.

Relay 12–CS operated opens the operating path for slow-to-release relay 12–SR extending ground to lead 1215, as previously described, which ground is further extended through make contacts 5–AC–3 to the winding of relay 4–ACT and relay 4–ACT locks through make contacts 4–SL–4. With relay 4–ACT operated, regenerator 701 is disconnected from leads 504 and 505 by break contacts 4–ACT–3 and 4–ACT–4. In addition, relay 4–ACT operated completes the operating path for relay 4–ACR through the make contacts of contacts 4–ACT–2, the break contacts of contacts 4–AN–9 and the break contacts of contacts 4–AOR–9.

Relay 4–ACR operated extends negative battery through resistor R401 to the tip lead of the answering cord, as previously described, which battery is further extended through the tip lead of the conference circuit and the break contacts of contacts 3–CTC–1 of the winding of relay 3–CTC which locks, as previously described. With relay 3–CTC operated the lip lead of the conference circuit is connected through regenerator 301 through the ring lead and the positive battery is removed from the ring lead, as previously described, whereby relay 12–CS releases. This, in turn, reoperates relay 12–SR and, as previously described, relay 12–SR extends ground through lead 405 and then through make contacts 5–AC–5, the break contacts of contacts 4–CT–5 and make contacts 4–ACR–1 to the winding of relay 4–CT which locks.

The operation of relay 4–CT releases relay 5–AC, as previously described. In addition, relay 4–CT operated extends the answering cord to leads 504 and 505 which path may be traced from the tip lead of the answering cord through the make contacts of contacts 4–CT–1, the make contacts of contacts 4–ACT–6, and leads 413 and 502 to lead 504, and from the ring lead of the answering cord through the make contacts of contacts 4–CT–2, the make contacts of contacts 4–ACT–5 and leads 412 and 503 to lead 505. With the teletypewriter subscriber in this case connected to the calling cord, relay 8–CCY is operated and leads 504 and 505 extend to coupler 703 whereby the teletypewriter subscriber is connected through the calling cord and the calling cord subset to the conference circuit.

The conference call is released by removing the answering cord from the conference circuit and releasing relays 3–SLC and 3–CTC in the conference circuit, as previously described. In addition, relay 4–SL in the cord circuit releases, whereby the locking path for relay 4–ACT is opened. The release of relay 4–ACT releases relay 4–ACR which, in turn, releases relay 4–CT, as previously described. This restores the cord circuit to the initial condition wherein the teletypewriter subscriber is attached to the calling cord.

Originating a Telephone Call

When the operator wishes to originate a telephone call, the talk key associated with either cord circuit is depressed and the appropriate cord is inserted into an outgoing trunk.

Assuming the call is made through the answering cord, the depression of the answer talk key completes the operating path for relay 8–TA through normally closed contacts 805. Relay 8–TA, in turn, operates relay 12–HD which operates relay 12–SR, as previously described. Relay 8–TA also operates relay 5–AC through make contacts 8–TA–6, contacts 516 of the answer talk key and break contacts 4–CT–7 and 5–CC–10. In addition, the operation of relay 8–TA extends negative marking battery to keyer transistor Q2B through diode CR1202, lead 1206, the break contacts of contacts 8–TY–9, FIG. 5, and make contacts 8–TA–10 whereby teletypewriter 1202 is maintained in the idle marking condition.

When the answering cord is inserted into the outgoing trunk circuit jack, the sleeve lead of the outgoing trunk circuit is extended to the windings of relays 12–MG1 and 12–B, as previously described. Relay 12–MG1, in turn, operates relay 2–SLO and 12–B operates relay 12–BB. The operation of relay 12–BB operates relay 4–SL, as previously described, and relay 4–SL locks to ground on the sleeve lead.

With relay 4–SL operated the operating path for relays 12–MG1 and 12–B is opened, releasing the latter relays and relay 12–B, in turn, releases relay 12–BB. In addition, relay 4–SL operated extends the ring lead of the answering cord through lead 403 to the winding of relays 12–MG and 12–TS, as previously described. Since the answering cord is connected to the outgoing trunk circuit and the outgoing trunk circuit provides negative battery to the ring lead through the low impedance of resistor R201, both relays 12–MG and 12–TS operate. The operation of relay 12–TS opens the operating path for slow-to-release relay 12–SR. When relay 12–SR releases, with relays 12–TS and 12–MG operated, the previously described operating path for relay 4–AOR is completed and the relay locks through make contacts 4–SL–4.

Relay 4–AOR completes the previously-described operating paths for relays 9–ATK and 5–RT and a supplemental operating path for relay 9–ATK through contacts 907 of the answer talk key and break contacts 7–ACON–3. In addition, relay 4–AOR operated completes the previously-described operating path for relay 4–ACR and relay 4–ACR, in turn, releases relays 12–MG and 12–TS. With relay 4–ACR operated, negative battery is applied to the tip lead of the answering cord, as previously described, whereby relay 2-CTO in the outgoing trunk circuit operates and extends the tip and ring leads of the outgoing trunk circuit across repeater coil T12. In addition, relay 2–CTO operated provides an off-hook signal to telephone line 201, as previously described.

Returning now to relay 12–TS released, the previously-described operating path for relay 12–SR is recompleted and relay 12–SR, in turn, operates relay 4–CT, as previously described. This opens the previously-described operating path for relay 5–AC and the relay releases. In addition, relay 4–CT operated cuts through the answering cord to terminals 1 and 2 of hybrid 601 and also extends the answering cord through the contacts of relays 9–ATK and 8–TA to the talking paths of leads 506 and 507, as previously described.

After the telephone central office receives the off-hook signal it returns a sender-ready signal by reversing the line battery on telephone line 201. This operates relay 2–L and relay 2–L, in turn, applies simplex ground to repeater coil T12. This simplex ground operates relay 6–A, as previously described, and relay 6–A, in turn, energizes lamp 902.

When answer lamp 902 is energized, indicating the reception of the sender-ready signal, the operator depresses KP key 1301 to operate relay 13–KP2, as previously described. With relay 13–KP2 operated, relay 12–KP operates, operating, in turn, relays 12–F and 12–KP1. The operation of relay 12–KP1 is followed by the release of relays 12–KP and 12–KP1, as previously described. After the release of relay 12–KP1, relay 12–MF operates and, as previously described, lamp 1304 is energized to indicate that the operator may key pulse out the digits. In addition, the previous operation of relay 12–KP1 applies 1100 and 1700 cycle tone across repeater coil T21, as previously described. The operator now proceeds to key pulse the appropriate digits applying the several tones through the talk path to the outgoing trunk circuit in the same manner as previously described. After key pulsing the digits, the operator depresses ST key 1302 momentarily operating relay 13–ST whereby 1500 and 1700 cycle tone is applied to the talk path to indicate the end of the digit pulsing, as previously described. While relay 13–ST is operated, a path is completed from ground through make contacts 13–ST–4, FIG. 12, lead 1213, make contacts 8–TA–1, FIG. 9, the make contacts of contacts 5–RT–8, contacts 905 of the answer talk key and the break contacts of contacts 9–LP–3 to the winding of relay 9–LP which locks through make contacts 4–CT–4 and break contacts 8–ACY–8. With relay 9–LP operated, the previously-described operating paths for relays 12–KP and 12–KP1 are open to preclude the calling of another telephone subscriber whereby a telephone connection between the subscribers cannot be completed through the cord circuit.

With relay 9–LP operated the release of relay 13–ST releases relay 12–F and relay 12–F, in turn, releases relay 12–MF. This de-energizes lamp 1304, as previously described.

The telephone central office proceeds to call the telephone subscriber and when the telephone subscriber goes off-hook the battery across telephone line 201 is again reversed, releasing relay 2–L. This removes the simplex ground applied to repeater coil T12 whereby relay 6–A releases. The release of relay 6–A de-energizes lamp 902. At this time the answering cord is connected through the talk path to telephone headset 1306. This path may be traced from the tip lead of the answering cord through the make contacts of contacts 4–CT–1, the break contacts of contacts 4–ACT–6, make contacts 9–ATK–4, make contacts 8–TA–2, lead 506, capacitor C1301 and the break contacts of contacts 12–F–9 to repeater coil T18 and from the ring lead of the answering cord through the make contacts of contacts 4–CT–2, the break contacts of contacts 4–ACT–5, make contacts 9–ATK–3, make contacts 8–TA–3, lead 507, capacitor C1302 and the break contacts of contacts 12–F–7 to repeater coil T18. Since repeater coil T18, in turn, is connected to jacks 13–JO, the operator inserts the plugs connected to telephone set 1306 to the jacks whereby talking may proceed between the operator and the remote telephone subscriber.

The operator may disconnect the talking connection by releasing the answer talk key and removing the answering cord. Releasing the answer talk key releases relay 8–TA which, in turn, releases relays 12–HD and 12–SR. Removal of the answering cord releases relay 2–SLO which, in turn, releases relay 2–CTO thereby restoring the outgoing trunk circuit to the normal quiescent state. In addition, the removal of the answering cord releases relay 4–SL which, in turn, releases relay 4–AOR. Relay 4–AOR released releases relays 9–ATK, 4–ACR and 5-RT. With relay 4-ACR released, relays 4-CT and 9-LP release, in turn.

In the event that the operator utilizes the calling cord to originate a telephone call, the depression of the call talk key operates relay 8-TA through contacts 806. In addition, with relay 8-TA operated, the operating path for relay 5-CC is completed through break contacts 5-AC-10, 5-CT1-7, contacts 517 of the call talk key and make contacts 8-TA-6. With relay 5-CC operated the sleeve lead of the calling cord is extended to the winding of relays 12-MG1 and 12-B operating these relays and relay 12-B, in turn, operates relay 12-BB. With relay 5-CC operated the operation of relay 12-BB operates relay 5-SL1 and relay 5-SL1, in turn, extends the ring lead of the calling cord to the winding of relays 12-MG and 12-TS, operating these latter relays. When relay 12-TS operates, the operating path for relay 12-SR is opened and upon the release of relay 12-SR the previously-described operating path for relay 4-COR is completed.

Relay 4-COR operated completes the previously-described operating path for relay 5-CCR and the operating path for relay 9-CTK through contacts 909 of the call talk key, break contacts 11-CCON-3 and make contacts 4-COR-3. Relay 5-CCR operated applies negative battery to the tip lead of the calling cord, as previously described, whereby relay 2-CTO in the outgoing trunk circuit operates to send the off-hook signal to telephone line 201 and extend the tip and ring leads across repeater coil T12. In addition, relay 5-CCR operated opens the previously-described operating path for relay 12-TS and relay 12-SR thereby reoperates. The operation of relay 12-SR then completes the previously-described operating path for relay 5-CT1 and relay 5-CT1, in turn, releases relay 5-CC.

With relays 5-CT1 and 9-CTK operated, the calling cord is extended to hybrid 1401 and further extended to talk path leads 506 and 507, as previously described. Accordingly, when the sender-ready signal is received and the simplex ground is applied to repeater coil T12, relay 14-C operates to energize lamp 904. The operator then proceeds to initiate a previously-described key pulsing sequence and at the end of the sequence, relay 13-ST is operated, as previously described. The operation of relay 13-ST extends ground through make contacts 13-ST-4, FIG. 12, lead 1213, make contacts 8-TA-1, FIG. 9, the break contacts of contacts 5-RT-8, contacts 906 of the call talk key and the break contacts of contacts 9-LP-5 to the winding of relay 9-LP which locks through make contacts 5-CT1-4 and break contacts 8-CCY-8. With relay 9-LP operated the subsequent release of relay 13-ST terminates the key pulsing sequence by releasing relays 12-F and 12-MF. The subsequent off-hook signal by the remote telephone subscriber then removes ground from repeater coil T12, as previously described, whereby relay 12-C releases to extinguish lamp 904. Since, at this time, the calling cord is connected through to the talk path, talking may now progress in the same manner as previously described.

The operator may disconnect this connection by releasing the call talk key and removing the answering cord. The release of the call talk key releases relay 8-TA which, in turn, releases relays 12-HD and 12-SR. The removal of the answering cord releases relay 2-SLO which, in turn, releases relay 2-CTO. In addition, relay 5-SL1 releases and the consequent release of relay 4-COR releases relays 5-CCR and 9-CTK. The release of relay 5-CCR releases relay 5-CT1 which, in turn, releases relay 9-LP restoring the cord circuit to the initial quiescent condition.

Recalling now that the operator, when placing a call to a teletypewriter subscriber, may reach a telephone subscriber in error, this situation occurs after the digits are key pulsed.

Assuming that the answering cord is being used for originating the call, the off-hook signal from the telephone subscriber reached in error releases relay 6-A which, in turn, releases relay 9-ATK and operates relay 9-RE. Since the operator is monitoring the call through the handset 604 when the telephone subscriber answers the call, the answer talk key is depressed to effect a talking connection. The depression of the answer talk key completes the previously-described operating path for relay 9-ATK through contacts 907 whereby the answering cord is extended through the talking path to repeater coil T18 which, in turn, is connected through jacks 13-JO to telephone headset 1306. Accordingly, the operator may advise the telephone subscriber that the call is in error and then disconnect the call by restoring the keys and removing the answering cord.

Similarly, the off-hook signal received from a telephone subscriber reached in error through the calling cord releases relay 14-C which, in turn, releases relay 9-CTK and operates relay 9-RE. When the operator ascertains that a telephone subscriber has been reached in error by monitoring handset 1404, the call talk key is depressed, operating relay 9-CTK through contacts 909, as previously described. This completes the previously-described talking path from the call cord to repeater coil T18, whereby the operator may advise the telephone subscriber that the call has been made in error. The call is then disconnected by releasing the keys and removing the cord.

*Reseizure*

A reseizure occurs when the operator has disconnected from a calling subscriber by releasing the answer-type key and another call is received before she has removed the answering cord from the incoming trunk circuit. In this event, the reception of the incoming call reoperates relay 1-LT, and relay 1-LT1, as previously described, completing a path from ground through make contacts 1-LT1-12 and make contacts 1-PTR-12 to the winding of relay 1-TR which locks through break contacts 1-S-7. Relay 1-TR operated extends 120-interruptions-per-minute supply, generally indicated by block 105, to repeater coil T11 and then across the tip and ring of the incoming trunk circuit and the tip and ring of the answering cord circuit to terminals 1 and 2 of hybrid 601. These interruptions are further applied to relay 6-A whereby relay 6-A operates and releases in accordance with the 120-interruptions-per-minute supply to flash lamp 902. This path may be traced from ground through the make contacts of contacts 6-A-9, make contacts 4-AN-6 and the break contacts of contacts 11-O-3 to lamp 902.

The operator must respond to the flashing of lamp 902 by depressing the answer-type key to determine if a subscriber recall signal has been received. Since the connection, in this event, is not complete, the operator cannot communicate with the teletypewriter subscriber and therefore withdraws the answering cord to remove the reseizure. This restores the relay in the cord circuit and releases relay 1-SLT in the incoming trunk circuit. The release of relay 1-SLT releases relays 1-CTT1 and 1-PTR and locks relay 1-TR through break contacts 1-SLT-7. In addition, relay 1-SLT released completes the energizing path for the trunk lamps through make contacts 1-LT1-8, break contacts 1-SLT-4 and make contacts 1-TR-8. Accordingly, with the lamps energized the answering of the call reoperates relay 1-SLT and relay 1-SLT operated opens the locking path for relay 1-TR. The consequent release of relay 1-TR restores the incoming trunk circuit to the normal condition.

Although a specific embodiment of this invention has been shown and described, it will be understood that various modifications may be made without departing from the spirit of this invention and within the scope of the appended claims.

What is claimed is:

1. In a data switching system, a plurality of outgoing trunk circuits, a plurality of incoming trunk circuits, a cord circuit including terminals for manual connection to the terminals of any one of said trunk circuits, first means responsive to the reception of signals in a first frequency band by said cord circuit for converting said received signals to data signals, second means responsive to the reception of signals in a second frequency band by said cord circuit for converting said latter received signals to data signals, means responsive to the connection of said cord circuit to said outgoing trunk circuit for enabling said first means, and means responsive to the connection of said cord circuit to said incoming trunk circuit for enabling said second means.

2. In a data switching system, a data receiver for receiving data signals, a plurality of outgoing trunk circuits, a plurality of incoming trunk circuits, a cord circuit including terminals for manual connections to the terminals of any one of said trunk circuits, first means responsive to the reception of signals in a first frequency band by said cord circuit for applying data signals to said receiver, second means responsive to the reception of signals in a second frequency band by said cord circuit for applying data signals to said receiver, means responsive to the connection of said cord circuit to said outgoing trunk circuit for enabling said first means, and means responsive to the connection of said cord circuit to said incoming trunk circuit for enabling said second means.

3. In a data switching system, a data transmitter for sending data signals, a plurality of outgoing trunk circuits, a plurality of incoming trunk circuits, a cord circuit including terminals for manual connection to the terminals of any one of said trunk circuits, first means responsive to data signals from said transmitter for applying signals in a first frequency band to said cord circuit, second means responsive to data signals from said transmitter for applying signals in a second frequency band to said cord circuit, means responsive to the connection of said cord circuit to said outgoing trunk circuit for enabling said first means, and means responsive to the connection of said cord circuit to said incoming trunk circuit for enabling said second means.

4. In a data switching system, a data transceiver for sending and receiving data signals, a plurality of outgoing trunk circuits, a plurality of incoming trunk circuits, a cord circuit including terminals for manual connection to the terminals of any one of said trunk circuits, first means responsive to data signals from said transmitter for applying signals in a first frequency band to said cord circuit, second means responsive to data signals from said transmitter for applying signals in a second frequency band to said cord circuit, third means responsive to the reception of signals in said first frequency band by said cord circuit for converting said received signals to data signals, fourth means responsive to the reception of signals in said second frequency band by said cord circuit for converting said latter received signals to data signals, means responsive to the connection of said cord circuit to said outgoing trunk circuit for enabling said first means and said fourth means, and means responsive to the connection of said cord circuit to said incoming trunk circuit for enabling said second means and said third means.

5. In a data switching system, a data transmitter for sending data signals, a plurality of outgoing trunk circuits, a plurality of incoming trunk circuits, a cord circuit including terminals for manual connection to the terminals of any one of said trunk circuits, first means responsive to data signals for applying signals in a first frequency band to said cord circuit, second means responsive to data signals for applying signals in a second frequency band to said cord circuit, means responsive to the connection of said cord circuit to said outgoing trunk circuit for enabling said first means, means responsive to the connection of said cord circuit to said incoming trunk circuit for enabling said second means, means responsive to the reception of signals in said first frequency band from said incoming trunk for connecting said transmitter to said second means, and means responsive to the reception of signals in sad second frequency band from said outgoing trunk for connecting said transmitter to said first means.

6. In a data switching system, a data transmitter for transmitting data signals, an outgoing trunk circuit, an incoming trunk circuit, a cord circuit including terminals for manual connection to either one of said trunk circuits, means responsive to the connection of said cord circuit to said outgoing trunk circuit for applying signals in a first frequency band to said cord circuit in accordance with the data signals transmitted by said transmitter, and means responsive to the connection of said cord circuit to said incoming trunk for applying signals in a second frequency band to said cord circuit in accordance with data signals transmitted by said transmitter.

7. In a data switching system, an outgoing trunk circuit, an incoming trunk circuit, a cord circuit including terminals for manual connection to either one of said trunk circuits, means responsive to the connection of said cord circuit to said outgoing trunk circuit for converting signals in a first frequency band received from said outgoing trunk circuit to data signals, and means responsive to the connection of said cord circuit to said incoming trunk circuit for converting signals in a second frequency band received from said outgoing trunk to data signals.

8. In a data switching system, a data receiver for receiving data signals, a plurality of outgoing trunk circuits, a plurality of incoming trunk circuits, a cord circuit including terminals for manual connection to any one of said trunk circuits, first means responsive to the connection of said cord circuit to said outgoing trunk circuit for converting signals in a first frequency band received from said outgoing trunk circuit to data signals, second means responsive to the connection of said cord circuit to said incoming trunk circuit for converting signals in a second frequency band received from said incoming trunk circuit to data signals, means responsive to the reception of signals in said first frequency band for connecting said receiver to said first means, and means responsive to the reception of signals in said second frequency band for connecting said receiver to said second means.

No references cited.